(12) United States Patent
Bonderson et al.

(10) Patent No.: US 9,256,834 B2
(45) Date of Patent: Feb. 9, 2016

(54) QUANTUM COMPUTERS HAVING PARTIAL INTERFEROMETRIC QUANTUM GATES

(71) Applicant: Microsoft Corporation, Redmond, WA (US)

(72) Inventors: Parsa Bonderson, Santa Barbara, CA (US); Michael H. Freedman, Santa Barbara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 14/108,097

(22) Filed: Dec. 16, 2013

(65) Prior Publication Data

US 2014/0354326 A1 Dec. 4, 2014

Related U.S. Application Data

(60) Provisional application No. 61/828,600, filed on May 29, 2013.

(51) Int. Cl.
*H03K 19/195* (2006.01)
*G06N 99/00* (2010.01)

(52) U.S. Cl.
CPC .................................... *G06N 99/002* (2013.01)

(58) Field of Classification Search
None
See application file for complete search history.

(56) References Cited

U.S. PATENT DOCUMENTS

| | | | |
|---|---|---|---|
| 5,130,766 A | 7/1992 | Arimoto et al. | |
| 6,459,097 B1 | 10/2002 | Zagoskin | |
| 7,018,852 B2 | 3/2006 | Wu et al. | |
| 7,453,162 B2 | 11/2008 | Freedman et al. | |
| 8,076,666 B2 | 12/2011 | Bonderson et al. | |
| 8,209,279 B2 | 6/2012 | Freedman et al. | |
| 8,774,641 B2 * | 7/2014 | Ohkawa | H04B 10/70 380/255 |
| 2007/0080339 A1 * | 4/2007 | Freedman | G06N 99/002 257/14 |
| 2008/0258049 A1 * | 10/2008 | Kuzmich | B82Y 10/00 250/214.1 |
| 2009/0079421 A1 * | 3/2009 | Freedman | G06N 99/002 324/207.2 |
| 2010/0264910 A1 * | 10/2010 | Bonderson | G06N 99/002 324/207.2 |
| 2011/0242632 A1 * | 10/2011 | Bennett | G06N 99/002 359/108 |
| 2013/0308956 A1 * | 11/2013 | Meyers | H04B 10/11 398/130 |
| 2014/0126030 A1 * | 5/2014 | Crespi | G06N 99/002 359/108 |
| 2014/0280427 A1 * | 9/2014 | Bocharov | B82Y 10/00 708/523 |
| 2014/0297708 A1 * | 10/2014 | Svore | G06F 17/10 708/517 |
| 2014/0354326 A1 * | 12/2014 | Bonderson | G06N 99/002 326/5 |
| 2015/0006597 A1 * | 1/2015 | Troyer | G06N 99/002 708/201 |
| 2015/0055961 A1 * | 2/2015 | Meyers | B82Y 10/00 398/140 |
| 2015/0077821 A1 * | 3/2015 | Smith | H04B 10/70 359/107 |

OTHER PUBLICATIONS

Georgiev, Lachezar S., "Topologically Protected Quantum Gates for Computation with Non-Abelian Anyons in the Pfaffian Quantum Hall State", In Journal of Physical Review B, vol. 74, Issue 23, Dec. 21, 2006, 6 pages.

(Continued)

*Primary Examiner* — Adam Houston
(74) *Attorney, Agent, or Firm* — Steve Wight; Sandy Swain; Micky Minhas

(57) ABSTRACT

A quantum computer may include topologically protected quantum gates and non-protected quantum gates, which may be applied to topological qubits. The non-protected quantum gates may be implemented with a partial interferometric device. The partial interferometric device may include a Fabry-Pérot double point contact interferometer configured to apply "partial" interferometry to a topological qubit.

20 Claims, 10 Drawing Sheets

(56) References Cited

OTHER PUBLICATIONS

Averin, et al., "Quantum Computation with Quasiparticles of the Fractional Quantum Hall Effect", In Journal of Solid State Communication, vol. 121, Issue 1, Dec. 24, 2001, 4 pages.
Hou, et al., ""Wormhole" Geometry for Entrapping Topologically-Protected Qubits in Non-Abelian Quantum Hall States and Probing Them with Voltage and Noise Measurements", In Journal of Physical Review Letters, vol. 97, Issue 14, Oct. 2, 2006, 5 pages.
Overbosch, et al., "Inequivalent Classes of Interference Experiments with Non-Abelian Anyons", In Proceedings of Physical Review A, vol. 64, Issue 6, May 4, 2001, 27 pages.
Bonderson, Parsa Hassan, "Non-Abelian Anyons and Interferometry", In Proceedings of Doctoral Dissertation, California Institute of Technology, May 23, 2007, 138 pages.
Bonderson, et al., "Interferometry of Non-Abelian Anyons", In Proceedings of Annals of Physics, vol. 323, Issue 11, Jan. 13, 2008, 62 pages.
Kitaev, A. Yu., "Fault-Tolerant Quantum Computation by Anyons", In Proceedings of Annals of Physics, vol. 303, Issue 1, Jan. 2003, 29 pages.
Freedman, Michael H., "P/NP, and the Quantum Field Computer", In Proceedings of the National Academy of Sciences, vol. 95, Issue 1, Jan. 6, 1998, 4 pages.
Preskill, John, "Fault-tolerant Quantum Computation", In Proceedings of Introduction to Quantum Computation, Oct. 15, 1998, 58 pages.
Freedman, et al., "A Modular Functor Which is Universal for Quantum Computation", In Proceedings of Book of Communications in Mathematical Physics, vol. 227, Issue 3, Jun. 2002, 18 pages.
Freedman, et al., "The Two-Eigenvalue Problem and Density of Jones Representation of Braid Groups", In Proceedings of Book of Communications in Mathematical Physics, vol. 228, Issue 1, Jun. 2002, 23 pages.
Freedman, et al., "Topological Quantum Computation", In Proceedings of Bulletin (New Series) of the American Mathematical Society, vol. 40, Issue 1, Oct. 10, 2002, 8 pages.
Nayak, et al., "Non-Abelian Anyons and Topological Quantum Computation", In Proceedings of Reviews of Modern Physics, vol. 80, Issue 3, Mar. 28, 2008, 73 pages.
Bonderson, et al., "Measurement-Only Topological Quantum Computation", In Proceedings of Physical Review, B 87, 035113, Aug. 15, 2008, 5 pages.
Bonderson, et al., "Measurement-Only Topological Quantum Computation via Anyonic Interferometry", In Proceedings of Analysis of Physics, Nov. 27, 2008, 57 pages.
Bravyi, et al., "Fermionic Quantum Computation", In Proceedings of Annals of Physics, vol. 298, Issue 1, Apr. 1, 2000, 18 pages, Receipt date: Dec. 16, 2013.
Bravyi, Sergey, "Universal Quantum Computation with the $v = 5/2$ Fractional Quantum Hall State", In Proceedings of Physical Review A, vol. 73, Apr. 12, 2006, 17 pages.
Chamon, et al., "Two Point-Contact Interferometer for Quantum Hall Systems", In Journals of Physical Review B, vol. 55, Issue 4, Jan. 15, 1997, 17 pages.
Fradkin, et al., "A Chern-Simons Effective Field Theory for the Pfaffian Quantum Hall State", In Proceedings of Nuclear Physics B, vol. 516, Nov. 1997, 10 pages.
Sarma, et al., "Topologically Protected Qubits from a Possible Non-Abelian Fractional Quantum Hall State", In Proceedings of Physical Review Letters, vol. 94, Issue 16, Apr. 27, 2005, 5 pages.
Stern, et al., "Proposed Experiments to Probe the Non-Abelian $v= 5/2$ Quantum Hall State", In Proceedings of Physical Review Letters, vol. 96, Issue 1, Jan. 6, 2006, 5 pages.
Bonderson, et al., "Detecting Non-Abelian Statistics in the $v = 5/2$ Fractional Quantum Hall State", In Proceedings of in Physical Review Letter, vol. 96, Issue 1, Feb. 4, 2006, 5 pages.
Bonderson, et al., "Probing Non-Abelian Statistics with Quasiparticle Interferometry", In Proceedings of Physical Review Letter, vol. 97, Issue 1, Jul. 6, 2006, 5 pages.
Fidkowski, Lukasz, "Double Point Contact in the $k = 3$ Read-Rezayi State", In Proceedings of Mesoscale and Nanoscale Physics, Apr. 25, 2007, 7 pages.
Ardonne, et al., "Non-Abelian Statistics in the Interference Noise of the Moore-Read Quantum Hall State", In Journal of Statistical Mechanics: Theory and Experiment, vol. 2008, Jan. 4, 2008, 5 pages.
Bishara, et al., "The Non-Abelian Interferometer", In Proceedings of Physical Review B, vol. 80, Issue 15, Oct. 5, 2009, 15 pages.
Akhmerov, et al., "Electrically Detected Interferometry of Majorana Fermions in a Topological Insulator", In Proceedings of Physics Review Letter, vol. 102, Issue 21, May 28, 2009, 4 pages, Receipt date: Dec. 16, 2013.
Fu, et al., "Probing Neutral Majorana Fermion Edge Modes with Charge Transport", In Proceedings of Physics Review Letter, vol. 102, Mar. 13, 2009, 4 pages.
Bonderson, et al., "Topological Quantum Buses: Coherent Quantum Information Transfer Between Topological and Conventional Qubits", In Proceedings of Physics Review Letter, vol. 106, Issue 13, Mar. 28, 2011, 5 pages.
Grosfeld, et al., "Observing Majorana Bound States of Josephson Vortices in Topological Superconductors", In Proceedings of the National Academy of Sciences of the United States of America, Aug. 18, 2011, 10 pages.
Camino, et al., "Realization of a Laughlin Quasiparticle Interferometer: Observation of Fractional Statistics", In Journals of Physics Review, Mar. 2005, 25 pages.
Willett, et al., "Measurement of Filling Factor 5/2 Quasiparticle Interference: Observation of e14 and e/2 Period Oscillations", In Proceedings of the National Academy of Sciences of the United States of America, Mar. 30, 2009, 26 pages.
Willett, et al., "Alternation and Interchange of e/4 and e/2 Period Interference Oscillations as Evidence for Filling Factor 5/2 non-Abelian Quasiparticles", In Proceedings of Mesoscale and Nanoscale Physics, Nov. 2009, 27 pages.
McClure, et al., "Fabry-perot Interferometry with Fractional Charges", In Proceedings of Physical Review Letters, vol. 108, Issue 25, Jun. 19, 2012, 5 pages.
An, et al., "Braiding of Abelian and Non-Abelian Anyons in the Fractional Quantum Hall Effect", In Proceedings of Mesoscale and Nanoscale Physics, Dec. 15, 2011, 15 pages.
Gottesman, Daniel, "The Heisenberg Representation of Quantum Computers", In Proceedings of the XXII International Colloquium on Group Theoretical Methods in Physics, Jul. 1, 1998, 20 pages.
Boykin, et al., "On Universal and Fault-Tolerant Quantum Computing", In Proceedings of the 40th Annual Symposium on Foundations of Computer Science, Oct. 17, 1999, 10 pages.
Aharonov, et al., "Significance of Electromagnetic Potentials in the Quantum Theory", In Proceedings of Physical Review, vol. 115, Issue 3, Aug. 1, 1959, 7 pages, Receipt date: Dec. 16, 2013.
Moore, et al., "Nonabelions in the Fractional Quantum Hall Effect", In Proceedings of Nuclear Physics B, vol. 360, Issue 2-3, Aug. 1991, 35 pages.
Lee, et al., "Particle-Hole Symmetry and the $v =512$ Quantum Hall State", In Proceedings of Physical Review Letters, vol. 99, Issue 23, Dec. 6, 2007, 5 pages.
Levin, et al., "Particle-Hole Symmetry and the Pfaffan State", In Proceedings of Physical Review Letters, vol. 99, Issue 23, Dec. 6, 2007, 5 pages.
Willett, et al., "Observation of an Even-Denominator Quantum Number in the Fractional Quantum Hall Effect", In Proceedings of Physical Review Letters, vol. 59, Issue 15, Oct. 12, 1987, 4 pages.
Pan, et al., "Exact Quantization of Even-Denominator Fractional Quantum Hall State at $v = 5/2$ Landau Level Filling Factor", In Proceedings of Physical Review Letters, vol. 83, Issue 17, Oct. 25, 1999, 5 pages.
Eisenstein, et al., "Insulating and Fractional Quantum Hall States in the First Excited Landau Level", In Proceedings of Physical Review Letters, vol. 88, Issue 7, Feb. 18, 2002, 4 pages.
Bonderson, et al., "Fractional Quantum Hall Hierarchy and the Second Landau Level", In Journal of Physical Review B, vol. 78, Issue 12, Sep. 2008, 10 pages.

(56) References Cited

OTHER PUBLICATIONS

Bonderson, et al., "Competing Topological Orders in the $v = 12/5$ Quantum Hall State", In Journal of Physical Review Letter, vol. 108, Jan. 2012, 5 pages.

Xia, et al., "Electron Correlation in the Second Landau Level; A Competition Between Many, Nearly Degenerate Quantum Phases", In Journal of Physical Review Letter, vol. 93, Issue 17, Oct. 2004, 5 pages.

Kumar, et al., "Nonconventional Odd-Denominator Fractional Quantum Hall States in the Second Landau Level", In Proceedings of Physical Review Letters, vol. 105, Dec. 2010, 4 pages.

Radu, et al., "Quasiparticle Tunneling in the Fractional Quantum Hall State at $v = 5/2$", In Journal of Science, vol. 320, Issue 5878, May 16, 2008, 6 pages, Receipt date: Dec. 16, 2013.

Bid, et al., "Observation of Neutral Modes in the Fractional Quantum Hall Regime", In Journal of Nature, vol. 466, Issue 585-590, Jul. 29, 2010, 8 pages.

Cooper, et al., "Quantum Phases of Vortices in Rotating Bose-Einstein Condensates", In Journal of Physical Review Letter, vol. 87, Issue 12, Aug. 30, 2001, 4 pages.

Cooper, N. R., "Exact Ground States of Rotating Bose Gases Close to a Feshbach Resonance", In Journal of Physical Review Letter, vol. 92, Issue 22, Jun. 4, 2004, 4 pages.

Bonderson, et al., "Plasma Analogy and Non-Abelian Statistics for Ising-type Quantum Hall States", In Journal of Physical Review Letter, vol. 83, Issue 7, Feb. 15, 2011, 68 pages.

Read, et al., "Paired States of Fermions in Two Dimensions with Breaking of Parity and Time-Reversal Symmetries, and the Fractional Quantum Hall Effect", In Journal of Physical Review Letter, vol. 61, Issue 15, Apr. 15, 2000, 35 pages.

Volovik, G.E., "Monopole, Half-Quantum Vortex, and Nexus in Chiral Superfluids and Superconductors", In Journal of Experimental and Theoretical Physics Letters, vol. 70, Dec. 1999, 4 pages.

Fu, et al., "Superconducting Proximity Effect and Majorana Fermions at the Surface of a Topological Insulator", In Journal of Physical Review Letter, vol. 100, Issue 9, Mar. 7, 2008, 4 pages.

Sau, et al., "A Generic New Platform for Topological Quantum Computation Using Semiconductor Heterostructures", In Journal of Physical Review Letters, vol. 104, Issue 4, Jan. 27, 2010, 4 pages.

Alicea, Jason, "Majorana Fermions in a Tunable Semiconductor Device", In Journal of Physical Review B, vol. 81, Issue 12, Mar. 15, 2010, 10 pages.

Qi, et al., "Chiral Topological Superconductor from the Quantum Hall State", In Journal of Physical Review B, vol. 82, Issue 18, Nov. 10, 2010, 5 pages.

Kitaev, Alexei, "Anyons in an Exactly Solved Model and Beyond", In Journal of Annals of Physics, vol. 321, Issue 1, Jan. 2006, 113 pages.

Bonderson, et al., "Implementing Arbitrary Phase Gates with Ising Anyons", In Journal of Physical Review Letters, vol. 104, Issue 18, May 7, 2010, 5 pages, Receipt date: Dec. 16, 2013.

Clarke, et al., "Improved Phase Gate Reliability in Systems with Neutral Ising Anyons", In Journal of Physical Review B, vol. 82, Issue 18, Nov. 29, 2010, 5 pages.

Bravyi, et al., "Universal Quantum Computation with Ideal Clifford Gates and Noisy Ancillas", In Journal of Physical Review A, vol. 71, Issue 2, Feb. 22, 2005, 15 pages.

\* cited by examiner

QUANTUM COMPUTERS HAVING PARTIAL INTERFEROMETRIC QUANTUM GATES

CROSS REFERENCE TO RELATED PATENT APPLICATIONS

This application claims priority from U.S. Provisional Application No. 61/828,600, filed May 29, 2013, which provisional application is incorporated herein by reference in its entirety.

BACKGROUND

Anyonic interferometry is a powerful tool for processing topological quantum information. Anyonic interferometry may be used to non-demolitionally measure the collective anyonic charge of a group of (non-Abelian) anyons, without decohering internal state of the anyons, and consequently, anyonic interferometry may be used to generate braiding operators, change between different qubit encoding, and generate entangling gates.

By utilizing braiding operations and conventional, or complete, anyonic interferometry measurements for Ising-type quasiparticles, only the Clifford group operations, which is not computationally universal and, in fact, can be efficiently simulated on a classical/digital computer, can be generated.

Topological quantum computers based on Ising-type quasiparticles using only braiding operations and conventional/complete anyonic interferometry measurements lack a computationally universal set of topologically protected gates that may be applied to topological qubits.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

A novel implementation of anyonic interferometry that is called herein "partial interferometry" can be used to produce operations on topological qubits. In particular, partial anyonic interferometry operations may be used to prepare desired states for topological qubits. Partial anyonic interferometry operations may be used to generate "magic states" for Ising-type anyons, which can be used to implement $\pi/8$-phase gates, and thereby provide in conjunction with Clifford gates a computationally universal gate set.

Illustrative Environment

Figure 1:
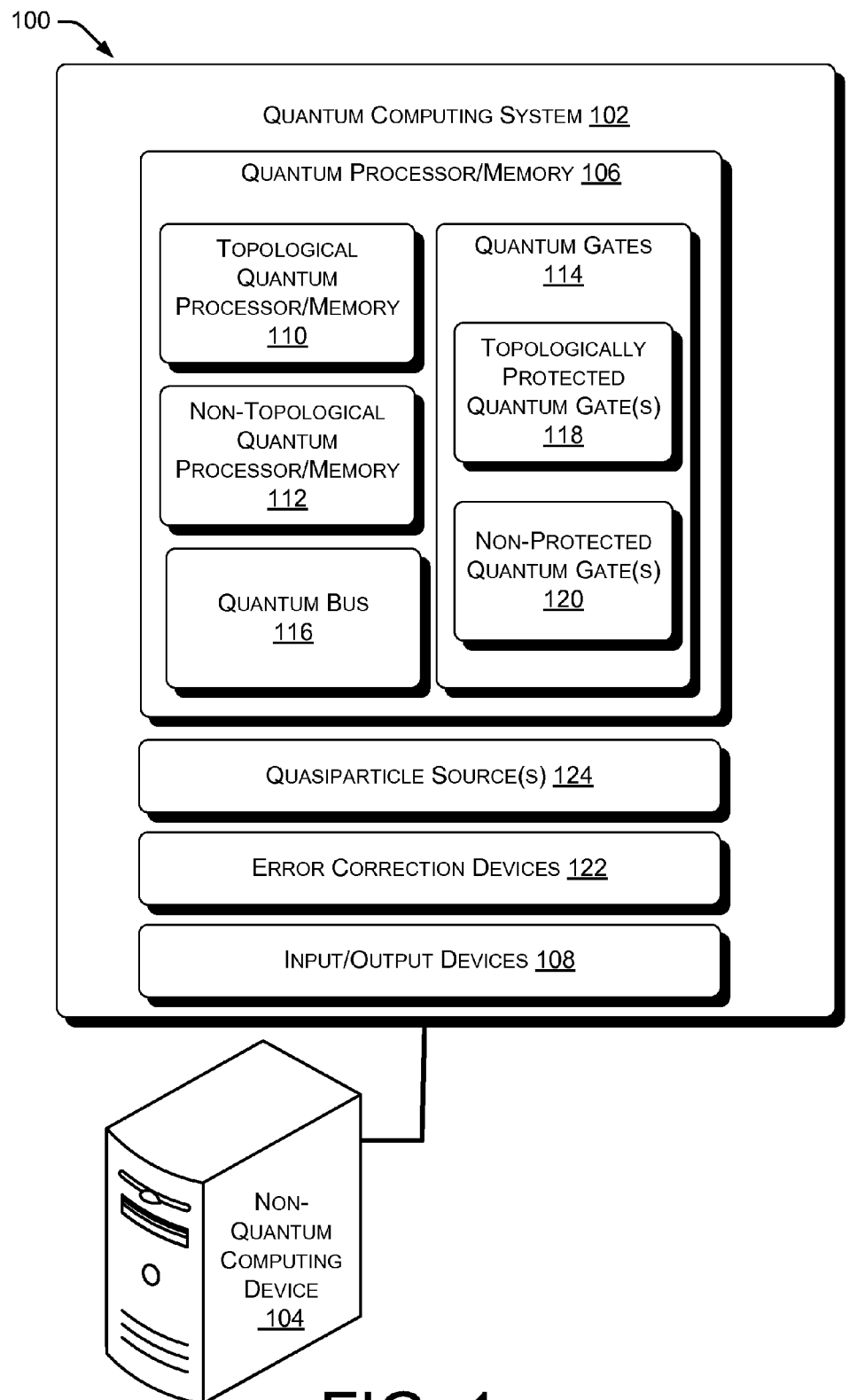
FIG. 1 is a schematic diagram of an example environment for performing quantum calculations.

FIG. 1 is a schematic diagram of an example environment 100 for performing quantum calculations. The environment 100 includes a quantum computing system 102 and a non-quantum computing device 104. The non-quantum computing device 104 may be a digital computing system.

The quantum computing system 102 may include a quantum processor/memory 106 and input/output devices 108. The input/output devices 108 may include interferometers and other devices for, among other things, reading and setting states of qubits in the quantum processor/memory 106 and may include devices for interfacing with the non-quantum computing device 104.

The quantum processor/memory 106 may include topological quantum processor/memory 110, non-topological quantum processor/memory 112, quantum gates 114, and a quantum bus 116. The topological quantum processor/memory 110 may include devices and components for providing topological based quantum computing, e.g., 5/2 quantum Hall systems and systems exhibiting Majorana modes such as, but not limited to, 1-dimensional or quasi 1-dimensional wires. For further details of systems exhibiting Majorana modes see U.S. patent application Ser. No. 13/860,246, filed on Apr. 10, 2013, entitled "Multi-Band Topological Nanowires," which is incorporated herein by reference in its entirety.

The non-topological quantum processor/memory 112 may include devices and components for providing non-topological based quantum computing. For example, the non-topological quantum processor/memory 112 may include devices such as, but not limited to, Josephson junctions for providing flux qubits, charge qubits, spin qubits, etc.

The quantum bus 116 may include devices and components for providing an interface between quantum processor/memory 106 and the input/output devices 108. The quantum bus 116 may include devices and components for providing an interface between qubits. For example, the quantum bus 116 may provide an interface between the topological quantum processor/memory 110 and the non-topological quantum processor/memory 112.

The quantum gates 114 may include various devices and components for performing various operations on qubit states. For example, quantum gates 114 may include devices and components for, among others, Hadamard gates, phase gates, unitary gates, controlled gates (e.g., controlled unitary gates), adder gates, and corresponding adjoint adder gates. The quantum gates 114 may be a universal set of gates comprising Clifford gates, which is generated by the gates $$H = \frac{1}{\sqrt{2}}\begin{bmatrix} 1 & 1 \\ 1 & -1 \end{bmatrix}, P = R_{\frac{\pi}{2}} = \begin{bmatrix} 1 & 0 \\ 0 & i \end{bmatrix}, T = R_{\frac{\pi}{4}} = \begin{bmatrix} 1 & 0 \\ 0 & e^{\frac{i\pi}{4}} \end{bmatrix} \text{ and}$$

$$CNOT = \begin{bmatrix} 1 & 0 & 0 & 0 \\ 0 & 1 & 0 & 0 \\ 0 & 0 & 0 & 1 \\ 0 & 0 & 1 & 0 \end{bmatrix}.$$

The quantum gates 114 may include topologically protected quantum gates 118 and non-protected quantum gates 120. Topologically protected gates 118 are comprised of gates that are generally immune to local interactions with external influences. In topologically protected gates, energy splitting of degenerate states are exponentially suppressed by the distance between quasiparticles, i.e., corrections are on the order of $O(e^{-r/L})$, where r is the distance between quasiparticles and L is the correlation length.

Non-protected gates 120 are comprised of gates that are not topologically protected. For example, as explained below, a partial interferometric quantum gate is not protected because the probabilities of probe measurement outcomes (which detector probe quasiparticles are detected at after passing through a quasiparticle interferometer) and the resulting operation (gate) acting on a topological qubit depend in a sensitive (i.e., the dependence is not exponentially suppressed) way on the parameters of the quasiparticle interferometer, such as: number of probe quasiparticles (V) sent through the quasiparticle interferometer, tunneling/reflection amplitudes (t and r) of the beam-splitters of the quasiparticle interferometer, tunneling coefficients (t) at point contacts, and phases acquired by probe quasiparticles due to traversing the different paths around $\theta_I$ and $\theta_{II}$).

It should be noted that this gate operation dependence is distinct from the dependence of measurement outcomes on the state of the measured system. Such a measurement dependence always exists when a measurement is performed.

In contrast to "partial" interferometry, a "normal" or "complete" interferometry measurement, which is obtained by taking the limit where the number of probes (N) is large, is topologically protected. Specifically, the measurement outcome and resulting operation performed on the measured topological qubit are essentially independent, up to $O(e^{-\{cN\}})$ corrections that are exponentially suppressed in N (where c is some constant that depends on the system), of the interferometer's parameters, and only depend on the state of the qubit. In this way, deviations from the ideal results can be further reduced exponentially by increasing N.

For the purposes of this disclosure topological protection of a state or an operation means that such a state or operation behaves ideally, up to corrections/errors that are exponentially suppressed by some parameters. In this case the state or operation is robust to small perturbations or variations of the system parameters. Some important examples include errors and decoherence due to thermal excitations are exponentially suppressed in inverse temperature, i.e. $O(e^{-\Delta/T})$, where $\Delta$ is the energy gap of the system. Errors in topological states/qubits due to interactions between quasiparticles are exponentially suppressed in quasiparticle separations r, i.e. $O(e^{-r/L})$, where L is the correlation length. Errors in gate operations obtained by braiding/moving quasiparticles are suppressed by the inverse of the rate omega ($\omega$) at which the operation is performed, i.e. $O(e^{-\Delta/\omega})$. Errors in a topological charge measurement performed via interferometry are suppressed by the number of probes used, i.e. $O(e^{-\{cN\}})$. To maintain topological protection, all of these parameters may be kept in a regime where the quantity in the exponential is large.

The quantum computing system 102 may also include error correction devices 122. The error correction devices 122 may perform error correction for topological qubits to which a non-protected quantum gate 120 has been applied. The error correction devices may apply "magic state distillation" protocol to topological qubits.

The quantum computing system 102 may also include quasiparticle sources 124. The quasiparticle sources 124 may include 5/2 quantum Hall systems, topological superconductors such as ($p_x+ip_y$) topological superconductors, Majorana heterostructures, and Majorana nanowires. The quasiparticle sources 124 provide quasiparticles that may be included in topological qubits.

Among other things, the non-quantum computing device 104 may interface with the input/output devices 108 to provide inputs (e.g., initial conditions of a problem to be solved by the quantum computing system 102) and receive outputs (e.g., measured quantum states). In some instances, the non-quantum computing device 104 may simulate a quantum computing device and/or perform quantum calculations.

Illustrative Quantum Gates

Figure 2:
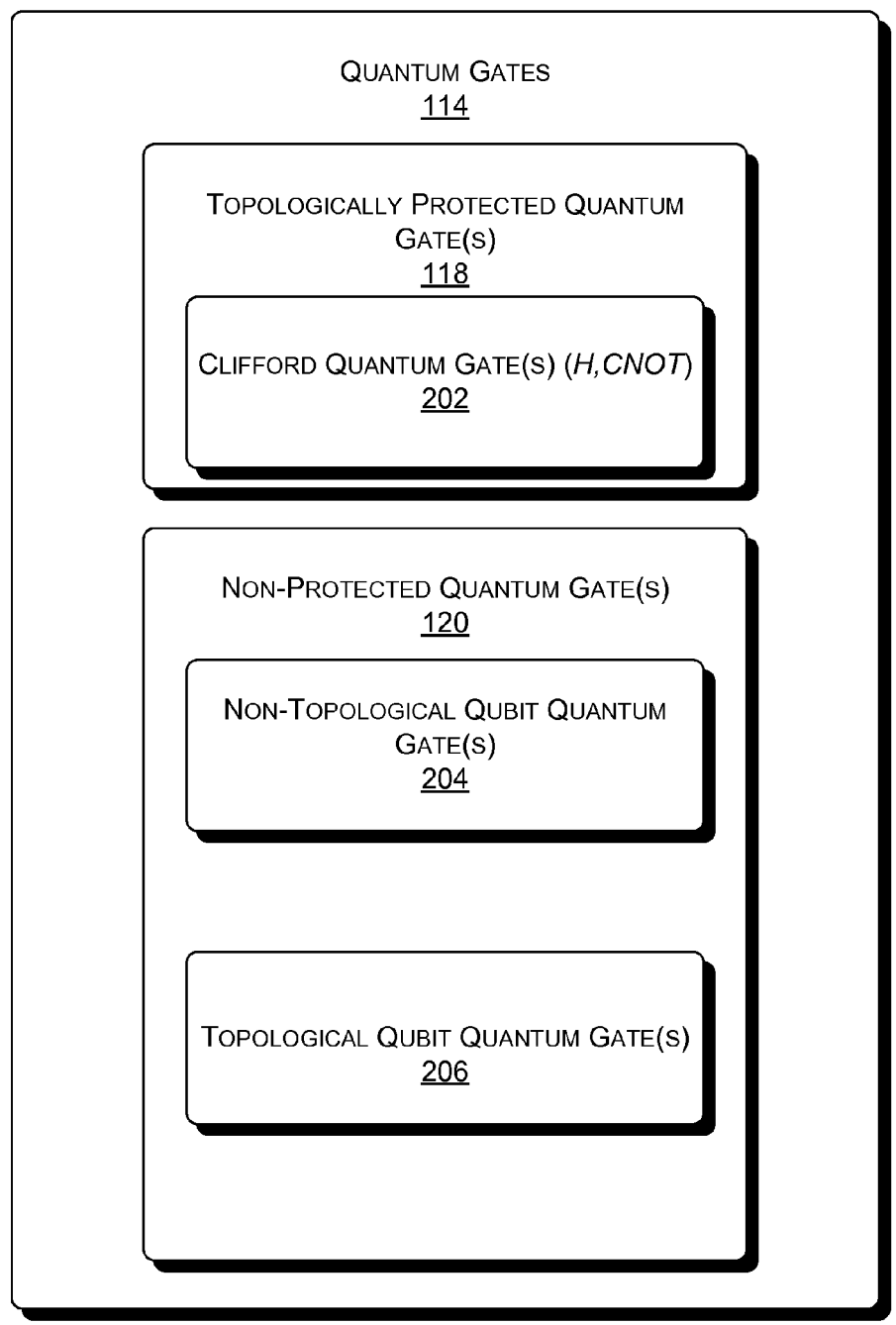
FIG. 2 is a schematic diagram of an illustrative quantum gate.

FIG. 2 shows a non-limiting embodiment of example quantum gates 114 having topologically protected quantum gates 118 and non-protected quantum gates 120. The topologically protected quantum gates 118 may include one or more of the Clifford gates 202, e.g., one or more of the H and/or CNOT gates.

The non-protected quantum gates 120 may include non-topological qubit quantum gates 204 and topological qubit quantum gates 206. The non-topological qubit quantum gates 204 may be comprised of various quantum systems, devices, components, circuits, etc., for implementing quantum gates on non-topological qubits, such as, but not limited to, charge qubits, spin qubits, flux qubits, etc. The topological qubit quantum gates 206 may be comprised of various quantum systems, devices, components, circuits, etc., for implementing quantum gates on topological qubits, which may be comprised of topological quasiparticles such as, but not limited to, non-abelian quasiparticles, Ising Anyons, Majorana quasiparticles.

The Clifford gates $$H = \frac{1}{\sqrt{2}}\begin{bmatrix} 1 & 1 \\ 1 & -1 \end{bmatrix}, P = R_{\frac{\pi}{2}} = \begin{bmatrix} 1 & 0 \\ 0 & i \end{bmatrix}, \text{ and } CNOT = \begin{bmatrix} 1 & 0 & 0 & 0 \\ 0 & 1 & 0 & 0 \\ 0 & 0 & 0 & 1 \\ 0 & 0 & 1 & 0 \end{bmatrix}$$

are examples of topologically protected gates that may be generated using Ising-type quasiparticles. Non-topologically protected gates 120 may include, as one non-limiting example, the $\pi/8$ gate.

Anyonic Interferometers.

Before describing how to utilize partial interferometry, a review of the effects and analysis of anyonic interferometry is provided below. In the following discussion, a quasiparticle interferometer 300 (see FIG. 3) is described as a Mach-Zehnder type interferometer for quasiparticles with non-Abelian braiding statistics. This will serve as a model for interferometry experiments with non-Abelian quasiparticles, and the methods used in this analysis readily apply to other classes of interferometers, e.g. (Fabrey-Pérot) fractional quantum Hall double point-contact interferometers in the weak tunneling limit. Further, while quasiparticles for performing interferometry and partial interferometry may be discussed herein in terms of anyons such discussion is non-limiting and other quasiparticles may be utilized.

The quasiparticle interferometer 300 may support an arbitrary anyon model, a.k.a. unitary braided tensor category, and also allows for a number of desired manipulations to be effected. The quasiparticle interferometer 300 may be capable of: (1) producing, isolating, and positioning desired quasiparticles such as anyons, (2) providing quasiparticles such as anyons with some manner of propulsion to produce a beam of probe quasiparticles such as anyons, (3) having lossless beam-splitters and mirrors, and (4) detecting the presence of a probe quasiparticle such as anyon at the output legs of the quasiparticle interferometer 300.

Figure 3A:
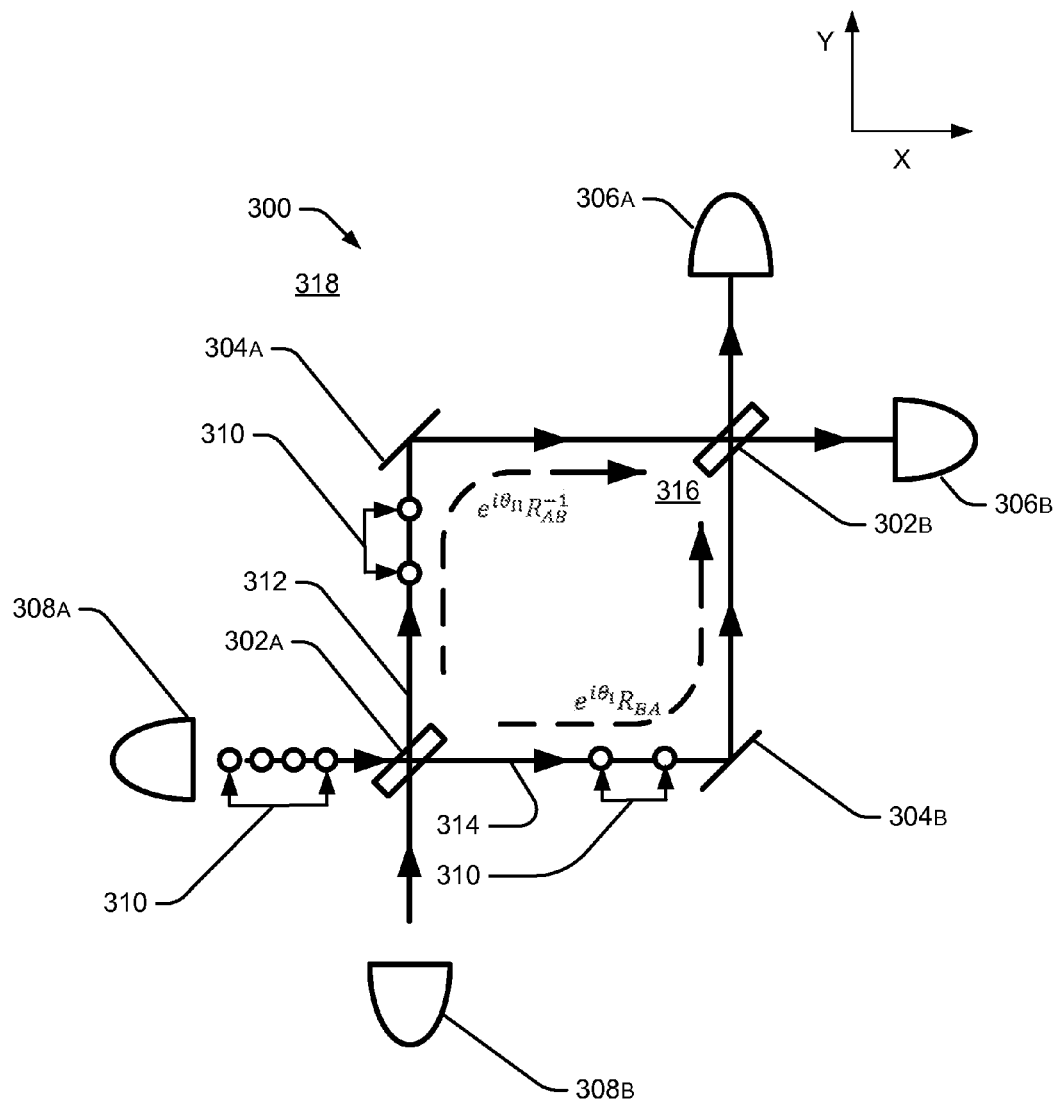
FIG. 3A is schematic diagram of an example quasiparticle interferometer.

FIG. 3A is a schematic illustration of an example quasiparticle interferometer 300. The quasiparticle interferometer 300 includes a pair of beam splitters (T), individually referenced as 302A and 302B and collectively referenced as 302, a pair of mirrors, individually referenced as 304A and 304B and collectively referenced as 304, a pair of detectors, individually referenced as 306A and 306B and collectively referenced as 306, and a pair of probe sources, individually referenced as 308A and 308B and collectively referenced as 308. In some instances, the quasiparticle interferometer 300 may include a single probe source 308.

The probe sources 308 provide one or more probe quasiparticles (such as anyons) 310 to the beam splitter 302A. The probe quasiparticles 310 may travel between beam splitter 302A and 302B by either a clockwise (CW) path 312 (beam splitter 302A to mirror 304A to beam splitter 306B) or a counter clockwise (CCW) path 314 (beam splitter 302A to mirror 304B to beam splitter 306B). From beam splitter 306B, probe quasiparticles 310 may travel to either one of the detectors 306. In some instances, the probe quasiparticles 310 may be anyons.

The CW path 312 and the CCW path 314 define a boundary between a central interferometric target region 316, circumscribed by the CW path 312 and the CCW path 314, and an external interferometric region 318.

Figure 3B:
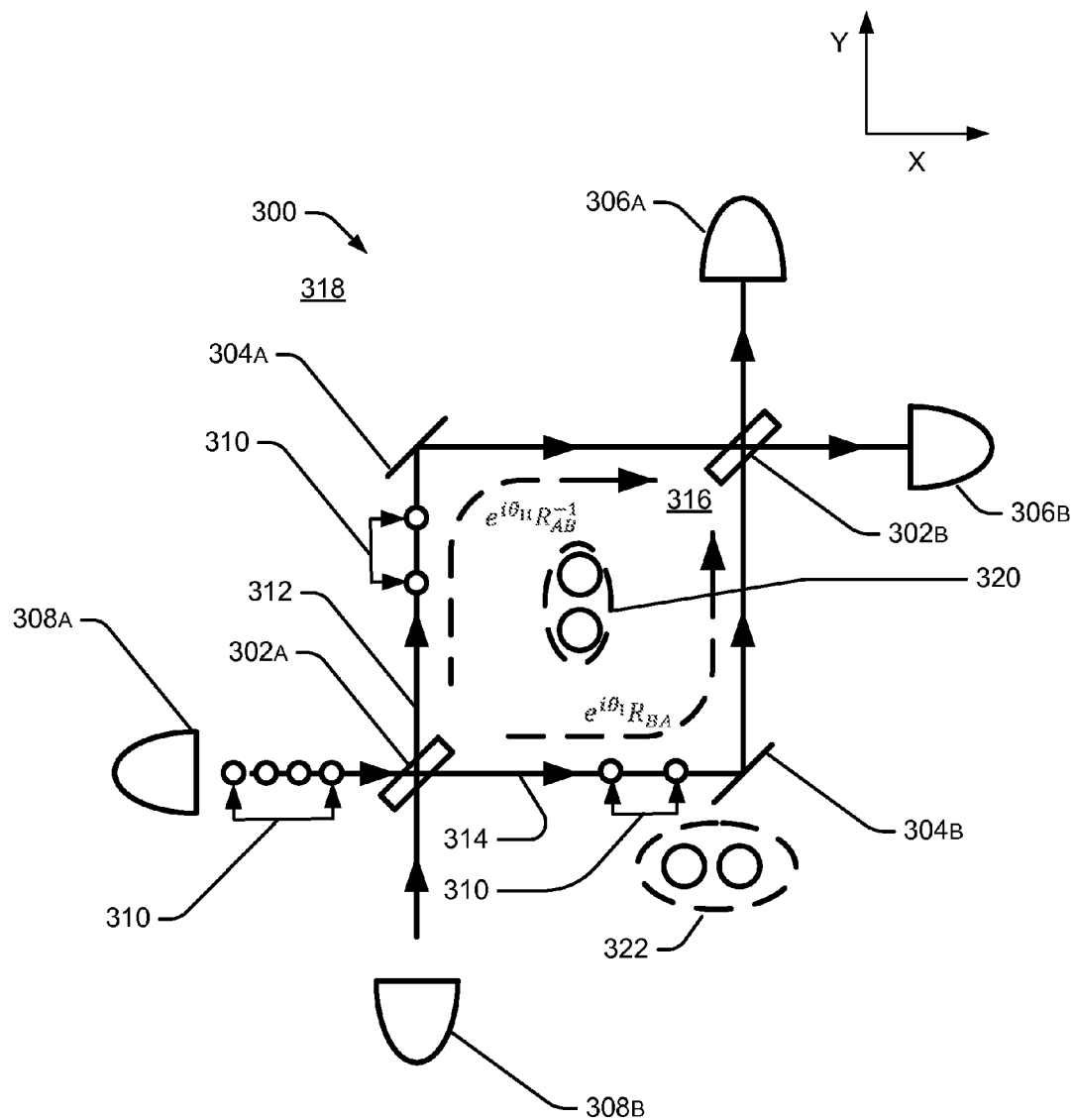
FIG. 3B is schematic diagram of the example quasiparticle interferometer of FIG. 3A with an example target system.

FIG. 3B is a schematic illustration of the example quasiparticle interferometer 300 of FIG. 3A with an example target system. The target system includes target quasiparticles (such as anyons) 320 and complementary-target quasiparticles (such as anyons) 322. The target quasiparticles 320 are disposed within the central interferometric target region 316 and share entanglement only with complementary-target quasiparticles 322 disposed in the external interferometric region 318. In some instances, the number of target quasiparticles 320 and the number of complementary-target quasiparticles 322 may be fewer or more than 2. While the complementary-target quasiparticles 322 are illustrated in external region 318 proximal to the mirror 304B and beam splitter 302A, the complementary-target quasiparticles 322 may be located, jointly or individually, anywhere in external region 318. Together, the target quasiparticles 320 and the complementary-target quasiparticles 322 may comprise a qubit such as, but not limited to, a 4-quasiparticle qubit.

A 4-quasiparticle qubit is comprised of four (4) quasiparticles. In some embodiments, the 4-quasiparticle qubit may be comprised of two qubit base pairs of quasiparticles, where a qubit base pair of quasiparticles means two entangled quasiparticles that are in a specified state. Accordingly, a 4-quasiparticle qubit may be initialized by taking two quasiparticles in a specified initial state, entangling them by, for example, applying a joint operation, measurement, gate, etc. on the pair of quasiparticles to form a first qubit base pair of quasiparticles, and then taking two other quasiparticles in a specified initial state and entangling them (by, for example, applying a joint operation, measurement, gate, etc. on the pair of quasiparticles) to form a second qubit base pair of quasiparticles.

It should be noted that the 4-quasiparticle qubit is only one type of a multi-quasiparticle qubit. For the purposes of this disclosure, an n-quasiparticle qubit means a qubit that is encoded by n quasiparticles, where n is an integer greater than 2. Further, a qubit base m-tuple of quasiparticles means m quasiparticles, where m is an integer greater than 1, that are in a specified fusion channel such as, but not limited to, the vacuum fusion channel, and in a specified initial state such as, but not limited to, the zero state. Consequently, an n-quasiparticle qubit may be formed by initializing multiple qubit base m-tuples of quasiparticles, e.g., a joint operation, measurement, gate, etc., may acts on the multiple qubit base m-tuples of quasiparticles. In the interest of clarity, example qubits are discussed herein as 4-quasiparticle qubit comprised of two sets of qubit base pairs of quasiparticles, but such discussion is non-limiting, and that generalized n-quasiparticle qubits comprised of multiple qubit base m-tuples of quasiparticles are within the scope of this disclosure. In the interest of brevity, qubit base m-tuples of quasiparticles may be referred to herein as qubit base quasiparticles.

The initialization of the 4-quasiparticle qubit may be completed by entangling the first qubit base pair of quasiparticles and the second qubit base pair of quasiparticles. The first qubit base pair of quasiparticles and the second qubit base pair of quasiparticles may be entangled by an operation, measurement, gate, etc. that acts on the four quasiparticles.

In some embodiments, the specified initial state for the quasiparticles of a qubit base pair of quasiparticles may be that the pair of quasiparticles are in a specified fusion channel such as, but not limited to, a vacuum fusion channel.

In some instances, a qubit base pair of quasiparticles may be formed by selecting a pair of candidate quasiparticles in a specified fusion channel. A joint measurement may be performed on the pair of candidate quasiparticles. If the measurement shows that the pair of candidate quasiparticles are in a specified state such as, but not limited to, the zero state, then the candidate quasiparticles form the base pair of quasiparticles. However, if the measurement shows that the pair of candidate quasiparticles are not in the specified state, then the pair of candidate quasiparticles are discarded and another pair of candidate quasiparticles are selected for forming the qubit base pair of quasiparticles.

In some instances, the target quasiparticles 320 may be a qubit base pair of quasiparticles. When the target quasiparticles 320 are a qubit base pair of quasiparticles, the quasiparticle interferometer 300 may be utilized to apply a single qubit phase gate $$R_\theta = \begin{bmatrix} 1 & 0 \\ 0 & e^{i\theta} \end{bmatrix}$$

to the qubit, such as the π/8 phase gate T.

In some instances, each one of the target quasiparticles 320 may be from different qubit base pairs of quasiparticles. When the target quasiparticles 320 are not a qubit base pair of quasiparticles, the quasiparticle interferometer 300 may be utilized to apply a conjugated gate to the qubit, such as the conjugation of the π/8 phase gate by Hadamard $H^{-1}TH$.

In some instances, the target quasiparticles 320 and the complementary-target quasiparticles 322 may comprise multiple qubits. For example, the target quasiparticles 320 may include two quasiparticles of a first 4-quasiparticle qubit and two quasiparticles of a second 4-quasiparticle qubit.

In some instances, the target quasiparticles 320 may comprise multiple quasiparticles from different qubit base pairs of quasiparticles, where the qubit base pairs of quasiparticles are from different qubits. For example, the target quasiparticles 320 may include 4 quasiparticles (qp_1 through qp_4), where quasiparticles qp_1 and qp_2 belong to a first qubit base pair of quasiparticles and a second qubit base pair of quasiparticles, respectively, of a first 4-quasiparticle qubit, and quasiparticles qp_3 and qp_4 belong to a first qubit base pair of quasiparticles and a second qubit base pair of quasiparticles, respectively, of a second 4-quasiparticle qubit.

In some instances, the target quasiparticles 320 may include one or more quasiparticles of a first qubit type encoding (e.g., a 4-quasiparticle qubit) and one or more quasiparticles of a second qubit type encoding (e.g., a 6-quasiparticle qubit).

The target quasiparticles 320 may be in a superposition of states with different total anyonic charges. Since these target quasiparticles 320 are collectively influenced by the quasiparticle interferometer 300, their individuality (and possible internal states) is ignored. The target quasiparticles 320 are considered a single quasiparticle capable of existing in superposition of different anyonic charges. The complementary-target quasiparticles 322 outside of the central interferometric target region 316 with which the target quasiparticles 320 share entanglement will be similarly treated collectively. Further, the probe quasiparticles 310 may be capable of charge superposition (though, for most cases of interest, attention may be restricted to identical probes with a definite value of anyonic charge).

The probe quasiparticles 310 are sent as a beam into the quasiparticle interferometer 300 through two possible input channels. The probe quasiparticles 310 pass through the beam splitter 302A, are reflected by the mirrors 304 around the central target region 316, pass through the second beam splitter 302B, and then are detected at one of the two possible output channels by the detectors 306. When a probe quasiparticle 310 passes through the CCW path 314 of the quasiparticle interferometer 300, the state acquires the phase $e^{i\theta_I}$ and is also acted on by the braiding operator $R_{BA}$. The phase $e^{i\theta_I}$ is the result of background Aharonov-Bohm interactions, path length differences, phase shifters, etc. The braiding operator $R_{BA}$ is strictly due to the braiding statistics between the probe quasiparticle 310 and the target quasiparticles 320. Similarly, when the probe quasiparticle 310 passes through the CW path 312 of the quasiparticle interferometer 300, the state acquires the phase $e^{i\theta_{II}}$ and is acted on by $R_{AB}^{-1}$.

Tensor Category Analysis.

In this section, the Mach-Zehnder quasiparticle interferometer 300 is reviewed in a general anyonic context. (For additional details and background on the unitary braided tensor category formalism used in the analysis see P. H. Bonderson, Non-Abelian Anyons and Interferometry, Ph.D., thesis, California Institute of Technology, 2007, and also A. Y. Kitaev, Fault-tolerant quantum computation by anyons, Annals Phys. 303 (2003) 2, quant-ph/9707021.)

The transmission and reflection coefficients for the beam splitters 302 are denoted as follows: horizontal transmission (i.e., in the x-direction) through a beam splitter 302 is denoted by $t_j$; vertical transmission (i.e., in the y-direction) through a beam splitter 302 is denoted by $-t_j^*$, leftward reflection (i.e., incident in the x-direction and reflected in the y-direction) is denoted by $r_j$, and rightward reflection (i.e., incident in the y-direction and reflected in the x-direction) is denoted by $r_j^*$, where j denotes either beam splitter 302A or 302B.

In the following equations target quasiparticles 320 may be denoted by A, probe quasiparticles 310 may be denoted by B, and complementary-target quasiparticles 322 may be denoted by C.

Using the Two-Component Vector Notation $$\begin{pmatrix}1\\0\end{pmatrix}=|\rightarrow\rangle, \begin{pmatrix}0\\1\end{pmatrix}=|\uparrow\rangle \tag{1}$$

to indicate the direction (horizontal or vertical) a probe quasiparticle 310 is traveling through the quasiparticle interferometer 300 at any point, the beam splitters 302 are represented by $$T_j = \begin{bmatrix} t_j & r_j^* \\ r_j & -t_j^* \end{bmatrix}, \tag{2}$$

where $|t_j|^2+|r_j|^2=1$. It should be noted that these matrices may be multiplied by overall phases without affecting any of the results, since such phases are not distinguished by the two paths.

The unitary operator representing a probe quasiparticle 310 passing through the quasiparticle interferometer 300 is given by $$U = T_2 \sum T_1 \tag{3}$$

$$\sum = \begin{bmatrix} 0 & e^{i\theta_{II}}R_{AB}^{-1} \\ e^{i\theta_I}R_{BA} & 0 \end{bmatrix}. \tag{4}$$

This can be written diagrammatically as (5)

$$\begin{array}{c}A\\ \hline U \\ B_{s'} \end{array}\begin{array}{c}B_s \\ \\ A\end{array} = e^{i\theta_I}\begin{bmatrix} t_1 r_2^* & r_1^* r_2^* \\ -t_1 t_2^* & -r_1^* t_2^* \end{bmatrix}_{s,s'} \begin{array}{c}B\\ \diagdown \\ A\end{array} + e^{i\theta_{II}}\begin{bmatrix} r_1 t_2 & -t_1^* t_2 \\ r_1 r_2 & -t_1^* r_2 \end{bmatrix}_{s,s'}\begin{array}{c}B\\ \diagup \\ A\end{array}$$

using the notation of writing the directional index s of the probe quasiparticle 310 as a subscript on its anyonic charge label, e.g. $b_s$.

The position of the complementary-target quasiparticles 322 (C) with respect to the target quasiparticles 320 (A) is specified, and it is taken to be located below the central interferometric target region 316 and slightly to the right of the target quasiparticles 320 (A). (The specification "slightly to the right" merely indicates how the diagrams are to be drawn, and has no physical consequence.) For this choice of positioning, the operator $$V = \begin{bmatrix} R_{CB}^{-1} & 0 \\ 0 & R_{CB}^{-1} \end{bmatrix} = \begin{array}{c}B\\ \diagdown \\ C\end{array} \tag{6}$$

represents the braiding of the complementary-target quasiparticles 322 (C) with the probe. A generalization for when the complementary-target quasiparticles 322 (C) are located above or both above and below the central interferometric target region 316 is provided herein below.

After a probe quasiparticle 310 (B) passes through the quasiparticle interferometer 300, it is measured at one of the two detectors 306 and the state of the probe quasiparticle 310 (B) undergoes the usual orthogonal measurement collapse with a projection $\Pi_s=|s\rangle\langle s|$ for the outcome $s=\rightarrow$ or $\uparrow$. After the detection of the probe quasiparticle 310 (B), it is no longer of interest, and is removed from the vicinity of the central interferometry region 316, tracing it out of the post-measurement state. For an initial state $\rho$ of the quasiparticle interferometer 300 (including the probe quasiparticles 310 (B)), the state after a probe quasiparticle 310 (B) passes through the quasiparticle interferometer 300, is measured at one of the detectors 306, which is denoted by $D_s$, and is traced out is given by $$\rho' = \frac{1}{Pr(s)}\widetilde{Tr}_B\left[\prod_s VU\rho U^\dagger V^\dagger \prod_s\right], \quad (7)$$

where $$Pr(s) = \widetilde{Tr}\left[\prod_s VU\rho U^\dagger V^\dagger\right] \quad (8)$$

is the probability of the measurement having outcome s, and the tilde over the traces indicates the "quantum trace" for anyonic states (defined diagrammatically by connecting outgoing and incoming lines representing the anyon being traced out).

When considering operations involving non-Abelian anyons, it is important to keep track of all other anyons with which there is non-trivial entanglement. Indeed, if these additional particles are not tracked or are physically inaccessible, one should trace them out of the quasiparticle interferometer 300, forgoing the ability to use them to form coherent superpositions of anyonic charge.

Each probe quasiparticle 310 is initially unentangled and sent into the quasiparticle interferometer 300 through the horizontal leg $s=\rightarrow$. In particular, it does not share entanglement with the target quasiparticles 320 (A) or the complementary-target quasiparticles 322 (C), nor with the other probe quasiparticles 310 (B). (This can be arranged by independently drawing each probe quasiparticle 310 (B) from the vacuum together with an antiparticle which is then discarded and traced out.) The probe quasiparticles 310 (B) may be treated as identical quasiparticles, each of which is described by the density matrix $$\rho^B = \sum_b \rho^B_{b\rightarrow} \frac{1}{d_b}|b_\rightarrow\rangle\langle b_\rightarrow| = \sum_b \rho^B_{b\rightarrow} \frac{1}{d_b}\left|b_\rightarrow\right. \quad (9)$$

where $Pr_B(b) = \rho_{b\rightarrow}^B$ is the probability that the probe quasiparticle 310 has charge b. It should be noted that the factors of $d_b$, the quantum dimension of anyon charge b, appears as normalizing factors in anyonic density matrix.

A target system may be comprised of the target quasiparticles 320 (A) and the complementary-target quasiparticles 322 (C) which are the only ones entangled with target quasiparticles 320 (A) that are kept physically accessible. Recall that these quasiparticles 320, 322 (and 310) may really represent multiple quasiparticles that are being treated collectively, but as long the operations of interest do not involve the individual quasiparticles, the quasiparticles 320, 322 (and 310) can be treated as a single quasiparticle such as an anyon which is allowed to have superpositions of different charge values. Thus, the density matrix of the target system is $$\rho^{AC} = \begin{array}{c}A\ |\ C\\ \boxed{\rho^{AC}}\\ A'\ |\ C'\end{array} = \sum_{a,a',c,c',f,\mu,\mu'} \frac{\rho^{AC}_{(a,c;f,\mu)(a',c';f,\mu')}}{(d_a d_{a'} d_c d_{c'} d_f^2)^{1/4}} \quad (10)$$

$$= \sum_{a,a',c,c',f,\mu,\mu'} \rho^{AC}_{(a,c;f,\mu)(a',c';f,\mu')} \frac{1}{d_f}|a,c;f,\mu\rangle\langle a',c';f,\mu'|.$$

The initial density matrix of the combined target and N unentangled probe quasiparticles is $$\rho = \rho^{B_1}\otimes\ldots\otimes\rho^{B_N}\otimes\rho^{AC}. \quad (11)$$

Here, the probe quasiparticles 310 (B) are initially unentangled, and their effect on the target system may be obtained by considering the effect of each probe quasiparticle 310 (B) individually and iterating the process. Thus, it is straightforward to obtain the many probe quasiparticle 310 (B) results from the single probe analysis.

Single Probe.

The details of the single probe analysis facilitate understanding the effect of a "partial interferometry measurement" and how to control it. The effect on the target system of a single probe passing through the quasiparticle interferometer 300 and being measured at one of the detectors 306 ($D_s$) is given by the map $$\rho^{AC} \mapsto \rho^{AC}(s) = \frac{1}{Pr(s)}\widetilde{Tr}_B\left[\prod_s VU(\rho^B\otimes\rho^{AC})U^\dagger V^\dagger \prod_s\right]. \quad (12)$$

To determine the result, the corresponding diagram for a single probe with definite anyonic charge b acting upon a specific basis element of the target system is evaluated and is given by (13)

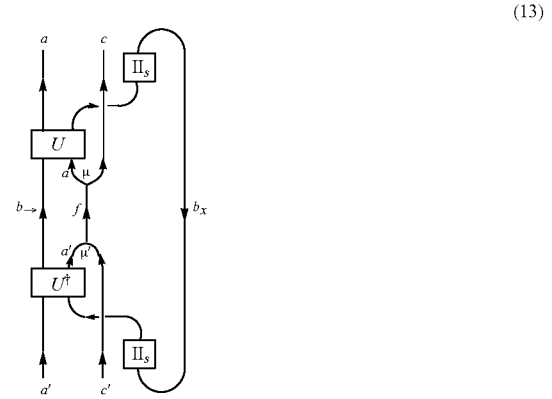

For the outcome s=→, i.e., a probe quasiparticle is detected by the detector 306B, as follows:
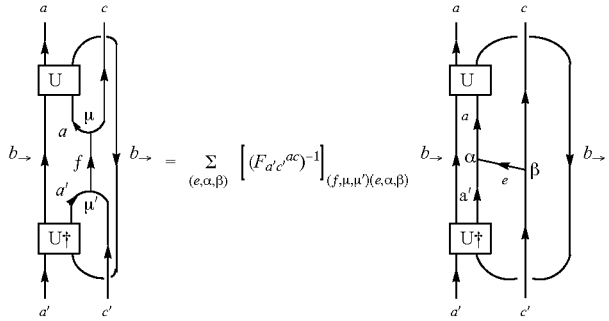
(14.1)
(14.2)
(14.3)

-continued $$= \sum_{(e,\alpha,\beta)} \left[(F_{a'c'}^{ac})^{-1}\right]_{(f,\mu,\mu')(e,\alpha,\beta)} \times \left\{ |t_1|^2 |r_2|^2 \begin{array}{c}\text{[diagram]}\end{array} + t_1 r_1^* r_2^* t_2 e^{i(\theta_I - \theta_{II})} \begin{array}{c}\text{[diagram]}\end{array} + \right. \tag{14.4}$$

$$\left. t_1^* r_1 t_2 r_2 e^{-i(\theta_I - \theta_{II})} \begin{array}{c}\text{[diagram]}\end{array} + |r_1|^2 |t_2|^2 \begin{array}{c}\text{[diagram]}\end{array} \right\} \tag{14.5}$$

$$= d_b \sum_{(e,\alpha,\beta)} \left[(F_{a'c'}^{ac})^{-1}\right]_{(f,\mu,\mu')(e,\alpha,\beta)} \vec{p}_{aa'e,b} \begin{array}{c}\text{[diagram]}\end{array}$$

$$= d_b \sum_{\substack{(e,\alpha,\beta)\\(f',\nu,\nu')}} \left[(F_{a'c'}^{ac})^{-1}\right]_{(f,\mu,\mu')(e,\alpha,\beta)} \vec{p}_{aa'e,b} \left[F_{a'c'}^{ac}\right]_{(e,\alpha,\beta)(f',\nu,\nu')} \begin{array}{c}\text{[diagram]}\end{array} \tag{14.6}$$

where $\vec{p}_{aa'e,b}$ is defined by $$\vec{p}_{aa'e,b} = |t_1|^2 |r_2|^2 M_{eb} + t_1 r_1^* r_2^* t_2 e^{i(\theta_I - \theta_{II})} M_{ab} + t_1^* r_1 t_2 r_2 e^{-i(\theta_I - \theta_{II})} M_{a'b}^* + |r_1|^2 |t_2|^2. \tag{15}$$

This calculation uses the diagrammatic rule $$\begin{array}{c}\text{[diagram]}\end{array} = \frac{S_{ab}}{S_{0a}} \begin{array}{c}\text{[diagram]}\end{array} \tag{16}$$

to remove the b loops, and the definitions of the topological S-matrix $$S_{ab} = \mathcal{D}^{-1} \widetilde{Tr}[R_{ba} R_{ab}] = \frac{1}{\mathcal{D}} \begin{array}{c}\text{[diagram]}\end{array}, \tag{17}$$

and the monodromy matrix $$M_{ab} = \frac{\widetilde{Tr}[R_{ba} R_{ab}]}{\widetilde{Tr} \mathbb{1}_{ab}} = \frac{1}{d_a d_b} \begin{array}{c}\text{[diagram]}\end{array} = \frac{S_{ab} S_{00}}{S_{0a} S_{0b}}, \tag{18}$$

which is an important quantity, typically arising in interference terms.

A similar calculation for the $s=\uparrow$ outcome (i.e., a probe quasiparticle 310 is detected at detector 306A) gives $$p_{aa'e,b}^\uparrow = |t_1|^2 |t_2|^2 M_{eb} - t_1 r_1^* r_2^* t_2 e^{i(\theta_I - \theta_{II})} M_{ab} - t_1^* r_1 t_2 r_2 e^{-i(\theta_I - \theta_{II})} M_{a'b}^* + |r_1|^2 |r_2|^2. \tag{19}$$

The results for general $\rho^B$ is obtained by simply replacing $p_{aa'e,b}^s$ everywhere with $$p_{aa'e,B}^s = \sum_b Pr_B(b) p_{aa'e,b}^s. \tag{20}$$

The notation $M_{aB} = \sum_b Pr_B(b) M_{ab}$ is also used. When it is said that a probe quasiparticle 310 (B) is able to distinguish two charges a and a' by monodromy, that means $M_{aB} \neq M_{a'B}$, and when it is said that a probe quasiparticle 310 (B) is able to detect a charge a by monodromy, it means that $M_{aB} \neq 1$.

From this, inserting the appropriate coefficients and normalization factors, the reduced density matrix of the target system after a single probe measurement with outcome s is found to be $$\rho^{AC}(s) = \sum_{\substack{a,a',c,c',f,\mu,\mu'\\(e,\alpha,\beta),(f',\nu,\nu')}} \frac{\rho_{(a,c;f,\mu)(a',c';f,\mu')}^{AC}}{(d_a d_{a'} d_c d_{c'} d_f^2)^{1/4}} \left[(F_{a'c'}^{ac})^{-1}\right]_{(f,\mu,\mu')(e,\alpha,\beta)} \times \tag{21}$$

-continued $$\frac{p_{aa'e,B}^{s}}{Pr(s)} [F_{a'c'}^{ac}]_{(e,\alpha,\beta),(f',v,v')}$$

$$= \sum_{\substack{a,a',c,c',f,\mu,\mu' \\ (e,\alpha,\beta),(f',v,v')}} \frac{\rho_{(a,c;f,\mu)(a',c';f,\mu')}^{AC}}{(d_f d_f)^{1/2}} [(F_{a'c'}^{ac})^{-1}]_{(f,\mu,\mu')(e,\alpha,\beta)} \times$$

$$\frac{p_{aa'e,B}^{s}}{Pr(s)} [F_{a'c'}^{a,c}]_{(e,\alpha,\beta),(f',v,v')} |a, c; f, v\rangle \langle a', c'; f, v'|$$

where the probability of measurement outcome s is computed by additionally taking the quantum trace of the target system, which projects onto the e=0 components, giving $$Pr(s) = \sum_{a,c,f,\mu} \rho_{(a,c;f,\mu),(a,c;f,\mu)}^{AC} p_{aa0,B}^{s} \quad (22)$$

It is noted that $$p_{aa0,b}^{\rightarrow} = |t_1|^2|r_2|^2 + |r_1|^2|t_2|^2 + 2Re\{t_1 r_1^* r_2^* t_2^* e^{i(\theta_I - \theta_{II})} M_{aB}\} \quad (23)$$

$$p_{aa0,B}^{\uparrow} = |t_1|^2|t_2|^2 + |r_1|^2|r_2|^2 - 2Re\{t_1 r_1^* r_2^* t_2^* e^{i(\theta_I - \theta_{II})} M_{aB}\} \quad (24)$$

give a well-defined probability distribution (i.e. $0 \leq p_{aa0,B}^{s} \leq 1$ and $p_{aa0,B}^{\rightarrow} + p_{aa0,B}^{\uparrow} = 1$).

For the purposes of this disclosure, this is a "single probe partial interferometry" operation.

Multiple Probes.

The results for multiple probes can now be produced. If N probe quasiparticles 310 are sent through the quasiparticle interferometer 300, a string of measurement outcomes $(s_1, \ldots, s_N)$ occurs with probability $$Pr(s_1, \ldots, s_N) = \sum_{a,c,f,\mu} \rho_{(a,c;f,\mu),(a,c;f,\mu)}^{AC} p_{aa0,B}^{s_1} \cdots p_{aa0,B}^{s_N} \quad (25)$$

and results in the measured target system reduced density matrix $$\rho^{AC}(s_1, \ldots, s_N) = \quad (26)$$

$$\sum_{\substack{a,a',c,c',f,\mu,\mu' \\ (e,\alpha,\beta),(f',v,v')}} \frac{\rho_{(a,c;f,\mu),(a',c';f,\mu')}^{AC}}{(d_f f_{f'})^{1/2}} [(F_{a',c'}^{a,c})^{-1}]_{(f,\mu,\mu')(e,\alpha,\beta)} \times$$

$$\frac{p_{aa'e,B}^{s_1} \cdots p_{aa'e,B}^{s_N}}{Pr(s_1, \ldots, s_N)} [F_{a',c'}^{a,c}]_{(e,\alpha,\beta)(f',v,v')} |a, c; f', v\rangle \langle a', c'; f', v'|.$$

It is clear that the specific order of the measurement outcomes is not important in the result, but that only the total number of outcomes of each type matters. Keeping track of only the total numbers leads to a binomial distribution. The total number of $s_j = \rightarrow$ in the string of measurement outcomes is denoted as n, and all results with the same n are clustered together. Defining (for arbitrary p and q)

$$W_N(n; p, q) = \frac{N!}{n!(N-n)!} p^n q^{N-n}, \quad (27)$$

the probability of measuring n of the N probes at the horizontal detector is $$Pr_N(n) = \sum_{a,c,f,\mu} \rho_{(a,c;f,\mu),(a,c;f,\mu)}^{AC} W_N(n; \vec{p}_{aa0,B}, \vec{p}_{aa0,B}^{\uparrow}) \quad (28)$$

and these measurements produce a resulting target system reduced density matrix $$\rho_N^{AC}(n) = \sum_{\substack{a,a',c,c',f,\mu,\mu' \\ (e,\alpha,\beta),(f',v,v')}} \frac{\rho_{(a,c;f,\mu),(a',c';f,\mu')}^{AC}}{(d_f f_{f'})^{1/2}} [(F_{a',c'}^{a,c})^{-1}]_{(f,\mu,\mu')(e,\alpha,\beta)} \times \quad (29)$$

$$\frac{W_N(n; \vec{p}_{aa'e,B}, \vec{p}_{aa'e,B}^{\uparrow})}{Pr_N(n)} [F_{a',c'}^{a,c}]_{(e,\alpha,\beta)(f',v,v')}$$

$$|a, c; f', v\rangle \langle a', c'; f', v'|.$$

For the purposes of this disclosure, equation 29 provides a "multiple probe partial interferometry" operation.

"Complete" Interferometry.

The limit as N→∞ is taken to determine the asymptotic behavior of interferometry when many probe quasiparticles 310 are sent through the quasiparticle interferometer 300. Clearly, there is never truly an infinite number N of probe quasiparticles, so the N→∞ limit is considered to be the regime which differs from this limit by corrections below some acceptable error threshold. Moreover, if one is not satisfactorily close to the N→∞ limit, one can simply send more probe quasiparticles through the quasiparticle interferometer 300 and the resulting target system state will approach its limiting value exponentially fast in N. For the purposes of this disclosure, this is what is meant by "complete" interferometry. In contrast, "partial" interferometry refers to sending only a fixed (and usually small) number of probe particles 310 (B) through the quasiparticle interferometer 300, the effect of which has been detailed in the previous two subsections. For a partial interferometry operation, the resulting target system state is not necessarily equal to (or nearly equal to) a N→∞ fixed state. If one sends more probe quasiparticles 310 through the quasiparticle interferometer 300 following a partial interferometry measurement, the target system's state will generally move towards an N→∞ fixed state. To more clearly depict the contrast, the analysis of the N→∞ limit is proved below.

In the N→∞ limit, the interferometry experiment distinguishes anyonic charges in the target system by their values of $p_{aa0,B}^{s}$, which determine the possible measurement distributions. Different anyonic charges with the same probability distributions of probe outcomes are indistinguishable by such probes, and so should be grouped together into distinguishable subsets. Let $\mathcal{C}_\kappa$ be defined to be the maximal disjoint subsets of $\mathcal{C}$, the set of all anyonic charge types, such that $p_{aa0,B}^{\rightarrow} = p_\kappa$, for all $a \in \mathcal{C}_\kappa$, i.e.

$$\mathcal{C}_\kappa = \{a \in \mathcal{C} : p_{aa0,B}^{\rightarrow} = p_\kappa\}$$

$$\mathcal{C}_\kappa \cap \mathcal{C}_{\kappa'} = \emptyset \text{ for } \kappa \neq \kappa'$$

$$\cup_\kappa \mathcal{C}_\kappa = \mathcal{C}. \quad (30)$$

Note that $\vec{p}_{aa0,B} = \vec{p}_{a'a'0,B}$ (for two different charges a and a') iff $$Re\{t_1 r_1^* r_2^* t_2^* e^{i(\theta_I - \theta_{II})} M_{aB}\} = Re\{t_1 r_1^* r_2^* t_2^* e^{i(\theta_I - \theta_{II})} M_{a'B}\} \quad (31)$$

which occurs either when:

(i) at least one of $t_1$, $t_2$, $r_1$, or $r_2$ is zero, or (ii) $|M_{aB}|\cos(\theta + \phi_a) = |M_{a'B}|\cos(\theta + \phi_{a'})$, where $\theta = \arg(t_1 r_1^* r_2^* t_2^* e^{i(\theta_I - \theta_{II})})$ and $\phi_a = \arg(M_{aB})$.

If condition (i) is satisfied, then there is no interference and $\mathcal{C}_0 = \mathcal{C}$ (all target system anyonic charges give the same probe measurement distribution). Condition (ii) is generically only satisfied when $M_{aB} = M_{a'B}$, but can also be satisfied with the fine-tuned condition $$\theta = -\arg\{M_{aB} - M_{a'B}\} \pm \frac{\pi}{2}.$$

The term "generic" is used herein only in reference to the collection of quasiparticle interferometer 300 parameters $t_j$, $r_j$, $\theta_I$, and $\theta_{II}$.

With this notation, the probabilities may be written in the convenient form $$Pr_N(n) = \sum_\kappa Pr_A(\kappa) W_N(n; p_\kappa, 1 - p_\kappa) \quad (32)$$

$$Pr_A(\kappa) = \tilde{T}r\left[\rho^{AC} \prod_{\mathcal{C}_\kappa}^A\right] = \sum_{a \in \mathcal{C}_\kappa, c, f, \mu} \rho^{AC}_{(a,c;f,\mu),(a,c;f,\mu)}, \quad (33)$$

where $$\prod_{\mathcal{C}_\kappa}^A = \sum_{a \in \mathcal{C}_\kappa} \prod_a^A \quad (34)$$

for $\Pi_a^A$ the projector of anyon(s) A onto (collective) anyonic charge a.

The projector onto collective topological charge a of n anyons (collectively denoted as A) of definite charges $a_1, \ldots, a_n$ is given by $$\Pi_a^A = \sum_{\substack{c_2,\ldots,c_{n-1} \\ \mu_2,\ldots,\mu_n}} \sqrt{\frac{d_a}{d_{a_1} \cdots d_{a_n}}} \quad (35)$$

The fraction $r = n/N$ of probe quasiparticles 310 (B) measured in the detector 302B ($s = \rightarrow$) will be found to go to $r = \kappa$ with probability $Pr_A(\kappa)$, and the target system anyon density matrix will generically collapse onto the corresponding "fixed states" given by $$\rho_\kappa^{AC} = \sum_{\substack{a,a',c,c',f,\mu,\mu' \\ (e,\alpha,\beta),(f',\nu,\nu')}} \frac{\rho^{AC}_{(a,c;f,\mu),(a';c';f,\mu')}}{(d_f f_{f'})^{1/2}} \left[(F_{a',c'}^{a,c})^{-1}\right]_{(f,\mu,\mu')(e,\alpha,\beta)} \times \quad (36)$$

$$\Delta_{aa'e,B}(p_\kappa)[F_{a'c'}^{ac}]_{(e,\alpha,\beta)(f',\nu,\nu')}|a,c;f',\nu\rangle\langle a',c';f',\nu'|$$

where $$\Delta_{aa'e,B}(p_\kappa) = \quad (37)$$

$$\begin{cases} \frac{1}{Pr_A(\kappa)} & \text{if } \vec{p}_{aa'e,B} = 1 - \vec{p}^{\uparrow}_{aa'e,B} = p_\kappa \text{ and } a, a' \in \mathcal{C}_\kappa \\ 0 & \text{otherwise} \end{cases}$$

(Fixed state density matrices are left unchanged by probe measurements.) We emphasize that the condition: $\vec{p}_{aa'e,B} = 1 - \vec{p}^{\uparrow}_{aa'e,B} = p_\kappa$ and $a,a' \in \mathcal{C}_\kappa$ is equivalent to $M_{eB} = 1$ (which also implies $M_{aB} = M_{a'B}$).

It is noted that if the probes can distinguish between all charge types, then each $\mathcal{C}_\kappa$ contains a single element and $M_{eB} = 1$ iff $e = 0$. The fixed states in this case are given by $$\rho_{\kappa_a}^{AC} = \sum_c \frac{Pr_A(c \mid a)}{d_a d_c} \prod_{ac} = \sum_{c,f',\nu} \frac{Pr_A(c \mid a)}{d_a d_c} |a,c;f',\nu\rangle\langle a,c;f',\nu| \quad (38)$$

where $$Pr_A(c \mid a) = \frac{\sum_{f,\mu} \rho^A_{(a,c;f,\mu),(a,c;f,\mu)}}{\sum_{c,f,\mu} \rho^A_{(a,c;f,\mu),(a,c;f,\mu)}} \quad (39)$$

for which the target quasiparticles 320 (A) have definite charge and no entanglement with the complementary-target quasiparticles 322 (C).

This calculation shows that asymptotic operation of a generically tuned quasiparticle interferometer 300 selects a charge sector κ with probability $Pr_A(K)$ and then: (1) projects the anyonic state onto the subspace where the target quasiparticles 320 (A) have collective anyonic charge in $\mathcal{C}_\kappa$, and (2) decoheres all anyonic entanglement between subsystem target quasiparticles 320 (A) and complementary-target quasiparticles 322 (C) that the probe quasiparticles 310 can detect. The sector κ may be a single charge or a collection of charges with identical monodromy elements with the probe quasiparticles 310, i.e. $M_{a,B} = M_{a',B}$ for $a,a' \in \mathcal{C}_\kappa$. The anyonic entanglement between the target quasiparticles 320 (A) and the complementary-target quasiparticles 322 (C) is described in the form of anyonic charge lines connecting these subsystems, i.e. the charge lines label by charge e in the preceding analysis, where the contribution of a diagram to the density matrix will be removed if it has $e \notin \mathcal{C}_0$ (i.e. $M_{eB} \neq 1$).

Generalized Target System.

Figure 3C:
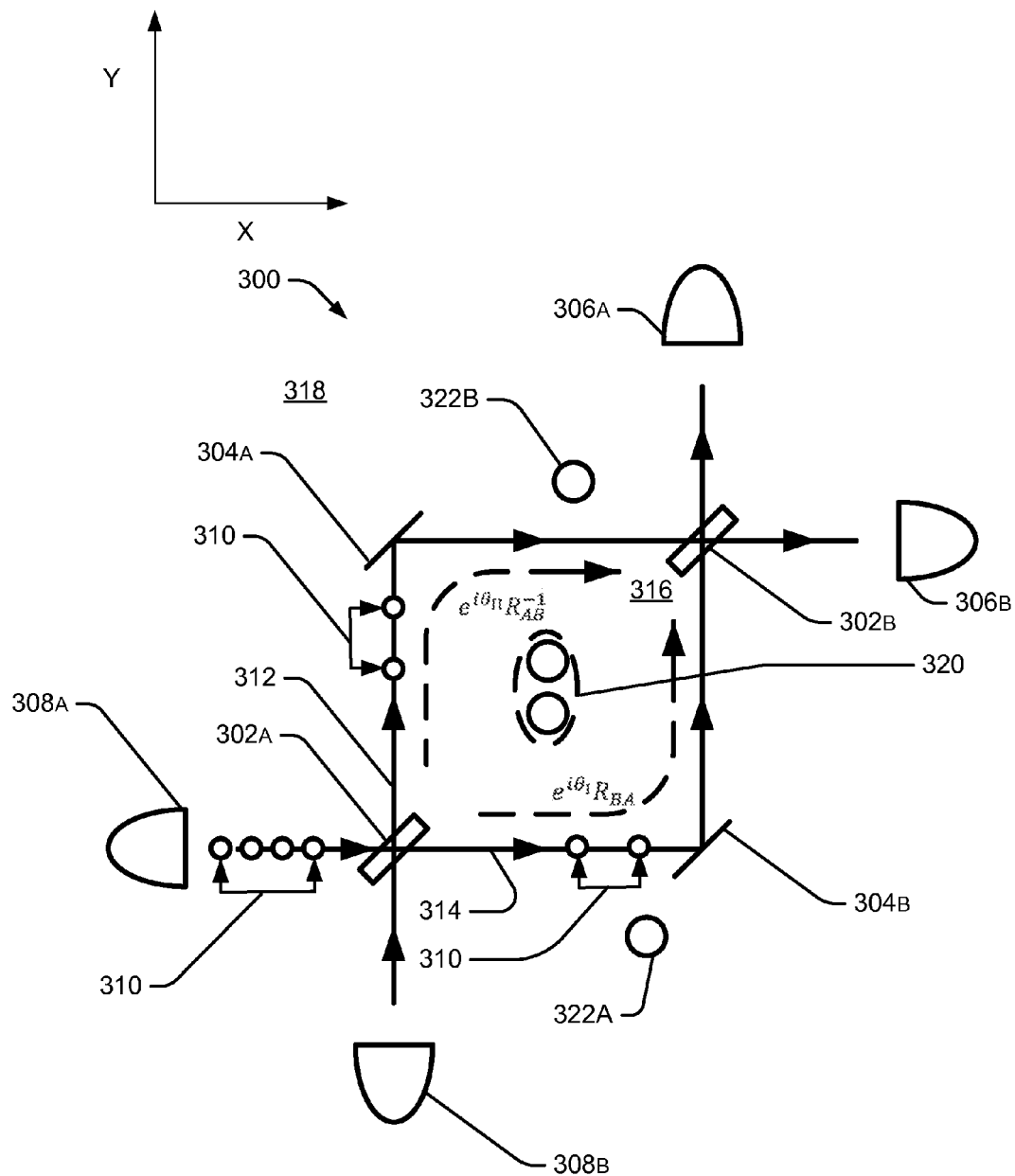
FIG. 3C is schematic diagram of the example quasiparticle interferometer of FIG. 3A with another example target system.

FIG. 3C is a schematic illustration of the example quasiparticle interferometer 300 of FIG. 3A with another example target system. The target system includes target quasiparticles (such as anyons) 320 and complementary-target quasiparticles (such as anyons) 322A and 322B. In the following equations target quasiparticles 320 may be denoted by A, probe quasiparticles 310 may be denoted by B, and complementary-target quasiparticles 322A and 322B may be denoted by $C_1$ and $C\_2$, respectively.

The complementary-target quasiparticles ($C_1$) 322A and ($C_2$) 322B may be split into two groups of quasiparticles located below and above the quasiparticle interferometer 300, respectively.

In this circumstance, the decoherence effect applies not just to anyonic entanglement lines connecting target quasiparticles 320 (A) with complementary-target quasiparticles 322A ($C_1$) and 322B ($C_2$), but also to anyonic entanglement lines connecting complementary-target quasiparticles 322A ($C_1$) with 322B ($C_2$), since these groups of complementary-target quasiparticles 322A ($C_1$) with 322B ($C_2$) are separated by the paths of the probe quasiparticles 310.

More specifically, one can start with a density matrix of the form $$\rho^{AC} = \begin{array}{c} C_2 \; A \; C_1 \\ \boxed{\rho^{AC}} \\ C'_2 \; A' \; C'_1 \end{array} \qquad (40)$$

$$= \sum_{\substack{a,c_1,c_2,g,f, \\ a',c'_1,c'_2,g'}} \frac{\rho^{AC}_{(c_2,a,g,c_1,f)(c'_2,a',g',c'_1,f)}}{(d_a d_{a'} d_{c_1} d_{c'_1} d_{c_2} d_{c'_2} d_f^2)^{1/4}} \; \text{(diagram)},$$

where the second line is written in the standard basis, and the Greek indices labeling the target states of the fusion/splitting spaces are left implicit to reduce clutter.

Applying a similar single probe analysis as before, the results involve sums of the following four diagrammatic equations (41)

weighted by the amplitudes for each configuration of the probe loop, corresponding to how the probe passes through the quasiparticle interferometer 300.

In order to evaluate the terms corresponding to these probe loop configurations, a more complicated sequence of F-moves is applied to the target density matrix. The sequence of F-moves is not explicitly written out, because it is cumbersome, but the steps are clear from analogy with the previous analysis. However, relevant intermediate stages of the diagrammatic equations in this sequence of F-moves are provided below:

(42)

The resulting factors multiplying the corresponding components of the density matrix are $$p_{h_1 h_2 e_1 e_2, b}^{\rightarrow} = |t_1|^2 |r_2|^2 M_{e_1 b} + t_1 r_1^* r_2^* t_2 e^{i(\Theta_I - \Theta_{II})} M_{h_1 b} + t_1^* r_1 t_2 r_2 e^{i(\Theta_I - \Theta_{II})} M_{h_2 b}^* + |r_1|^2 |t_2|^2 M_{e_2 b} \qquad (43)$$

$$p_{h_1 h_2 e_1 e_2, b}^{\uparrow} = |t_1|^2 |r_2|^2 M_{e_1 b} + t_1 r_1^* r_2^* t_2 e^{i(\Theta_I - \Theta_{II})} M_{h_1 b} - t_1^* r_1 t_2 r_2 e^{i(\Theta_I - \Theta_{II})} M_{h_2 b}^* + |r_1|^2 |t_2|^2 M_{e_2 b}, \qquad (43)$$

where the anyonic charges $h_1$, $h_2$, $e_1$, and $e_2$ label the fusion channels indicated in the diagrammatic equations of Eq. (42). The diagrammatic equations of Eq. (42) represent the steps (within the sequence of F-moves) at which one can apply Eq. (16) to remove the four configurations of the probe loop shown in Eq. (41). These four configurations, where the probe loop is linked on the $e_1$, $h_1$, $h_2$, and $e_2$ lines, respectively, give rise to the corresponding four terms in the expressions for $p_{h_1 h_2 e_1 e_2, b}^{s}$. When the probe quasiparticles 310 are allowed to carry different charge values, these factors may be replaced with their expectation values, which may then be denoted as $$p_{h_1 h_2 e_1 e_2, B}^{s} = \sum_b Pr_B(b) p_{h_1 h_2 e_1 e_2, b}^{s}. \qquad (45)$$

A similar multi-probe analysis can be used to obtain the state resulting from sending N probes through the quasiparticle interferometer 300. The asymptotic effect (N→∞) of running the quasiparticle interferometer 300 is given by the anyonic charge sets $$\mathcal{C}_\kappa \equiv \{a \in \mathcal{C} : p_{aa00,B}^{\rightarrow} = p_\kappa\}, \qquad (46)$$

the probability $$Pr_A(\kappa) = \widetilde{Tr} [\rho^{AC} \Pi \mathcal{C}_\kappa^A] \qquad (47)$$

that the interferometry measurement will correspond to outcome κ (i.e., that the collective charge of anyon(s) A is in $\mathcal{C}_\kappa$), and the quantity $$\Delta_{h_1 h_2 e_1 e_2, B}(p_\kappa) = \qquad (48)$$

$$\begin{cases} \dfrac{1}{Pr_A(\kappa)} & \text{if } p_{h_1 h_2 e_1 e_2, B}^{\rightarrow} = 1 - p_{h_1 h_2 e_1 e_2, B}^{\uparrow} = p_\kappa \text{ and } h_1, h_2 \in \mathcal{C}_\kappa \\ 0 & \text{otherwise} \end{cases},$$

which determines the components of the target anyons' density matrix that survive after the interferometry measurement. It should be emphasized that $h_1$ and $h_2$ are generally not the same as a and a'. However, the condition that $p_{h_1 h_2 e_1 e_2, B}^{\rightarrow} = 1 - p_{h_1 h_2 e_1 e_2, B}^{\uparrow} = p_\kappa$ and $h_1, h_2 \in \mathcal{C}_\kappa$ is equivalent to the condition that $M_{e_1 B} = M_{e_2 B} = 1$, which also implies that $M_{h_1 B} = M_{h_2 B} = M_{aB} = M_{a'B}$ and a,a'$\in \mathcal{C}_\kappa$. When the probes can distinguish between all charge types, then each $C_\kappa$ contains a single element and $M_{e_1 B} = M_{e_2 B} = 1$ iff $e_1 = e_2 = 0$. Thus, the (generically tuned) anyonic quasiparticle interferometer 300 in the asymptotic limit selects a charge sector $\kappa$ with probability $\text{Pr}_A(\kappa)$ and then: (1) projects the anyonic state onto the subspace where the target quasiparticles 320 (A) have collective anyonic charge in $C_\kappa$, and (2) decoheres all anyonic entanglement pairwise between subsystems of target quasiparticles 320 (A) and complimentary-target quasiparticles 322A ($C_1$) and 322B ($C_2$) that the quasiparticle probes 310 can detect.

Ising Anyons.

Ising-type anyons are one type of non-Abelian anyons. In quantum Hall systems, the Moore-Read (MR) Pfaffian and anti-Pfaffian states may include the $\nu = 5/2$ quantum Hall state, and the Bonderson-Slingerland (BS) hierarchy states over these systems may provide the $\nu = 12/5$ state. Additionally, the MR state may arise in rotating Bose condensates. These candidate quantum Hall states all possess quasiparticle excitations that are Ising-type anyons. Ising-type anyons also arise in the form of Majorana zero modes occurring in 2D topological ($p_x + ip_y$) superfluids and superconductors. Such topological superconductors are believed to be realized in strontium ruthenate ($Sr_2RuO_4$). In addition, topological superconductors may be synthesized in heterostructures of more mundane materials. Further, Ising anyons may be realized in Kitaev's honeycomb model.

The braiding operations of Ising anyons are known to generate a subset of the Clifford gates. As such, they are not computationally universal. Supplementing the braiding operations of Ising anyons with the ability to perform interferometry measurements of anyonic charge expands the set of topologically protected computational gates to the entire Clifford gate set, which is generated by the gates $$H = \frac{1}{\sqrt{2}} \begin{bmatrix} 1 & 1 \\ 1 & -1 \end{bmatrix}, \quad (49)$$

$$P = R_{\frac{\pi}{2}} = \begin{bmatrix} 1 & 0 \\ 0 & i \end{bmatrix},$$

and $$CNOT = \begin{bmatrix} 1 & 0 & 0 & 0 \\ 0 & 1 & 0 & 0 \\ 0 & 0 & 0 & 1 \\ 0 & 0 & 1 & 0 \end{bmatrix}.$$

(Note that the Clifford gates include the Pauli gates $\sigma^z = P^2$, $\sigma^x = H\sigma^z H$, and $\sigma^y = i\sigma^x\sigma^z$.) These are still not computationally universal, but can be made universal if supplemented by the $\pi/8$-phase gate $$T = R_{\frac{\pi}{4}} \quad (50)$$

$$= \begin{bmatrix} 1 & 0 \\ 0 & e^{i\pi/4} \end{bmatrix}$$

(or any $\theta/2$-phase gate $R_\theta = \text{diag}[1, e^{i\theta}]$ with $\theta \neq n\pi/2$) or, equivalently, the ability to produce "magic states," such as $$|\mathcal{B}_{-\frac{\pi}{4}}\rangle = HR_{\frac{\pi}{8}} H|0\rangle \quad (51)$$

$$= \cos(\pi/8)|0\rangle - i\sin(\pi/8)|1\rangle,$$

or any state obtained from this one by application of single-qubit Clifford gates. For the purposes of this disclosure the states are define by $$|\mathcal{B}_\phi\rangle = \cos(\phi/2)|0\rangle + i\sin(\phi/2)|1\rangle. \quad (52)$$

For convenience, note that the fusion and braiding properties of the Ising MTC are as follows:

$$\mathcal{C} = \{I, \sigma, \psi\},$$

$$I \times a = a,$$

$$\sigma \times \sigma = I + \psi,$$

$$\sigma \times \psi = \sigma,$$

$$\psi \times \psi = I$$

$$[F_\sigma^{\sigma\sigma\sigma}]_{ef} = [F_\sigma^{\sigma\sigma}]_{ef}$$

$$= \begin{bmatrix} \frac{1}{\sqrt{2}} & \frac{1}{\sqrt{2}} \\ \frac{1}{\sqrt{2}} & \frac{-1}{\sqrt{2}} \end{bmatrix}_{ef}$$

$$[F_\psi^{\sigma\psi\sigma}]_{\sigma\sigma} = [F_\sigma^{\psi\sigma\psi}]_{\sigma\sigma}$$

$$= [F_{\psi\sigma}^{\sigma\psi}]_{\sigma\sigma}$$

$$= [F_{\sigma\psi}^{\psi\sigma}]_{\sigma\sigma}$$

$$= -1$$

$$R_I^{\sigma\sigma} = e^{-i\frac{\pi}{8}},$$

$$R_\psi^{\sigma\sigma} = e^{-i\frac{3\pi}{8}},$$

$$R_\sigma^{\sigma\psi} = R_\sigma^{\psi\sigma}$$

$$= e^{-i\frac{\pi}{2}},$$

$$R_I^{\psi\psi} = -1$$

$$S = \frac{1}{2} \begin{bmatrix} 1 & \sqrt{2} & 1 \\ \sqrt{2} & 0 & -\sqrt{2} \\ 1 & -\sqrt{2} & 1 \end{bmatrix}$$

$$M = \begin{bmatrix} 1 & 1 & 1 \\ 1 & 0 & -1 \\ 1 & -1 & 1 \end{bmatrix}$$

$$d_I = d_\psi$$

$$= 1,$$

$$d_\sigma = \sqrt{2},$$

$$\mathcal{D} = 2$$

$$\theta_I = 1,$$

$$\theta_\sigma = e^{i\frac{\pi}{8}},$$

$$\theta_\psi = -1$$

where I is the vacuum charge (previously denoted by 0), e, f $\in \{I, \Psi\}$, and the Greek symbols labeling fusion vertices are omitted because there are trivially determined as there are no fusion multiplicities ($N_{ab}^c = 0$ or 1). The F-symbols and R-symbols not listed here are trivial, meaning they are equal to 1 if allowed by the fusion rules.

For interferometers, Ising anyons give $$p_I = p_{III,\vec{\sigma}} = |t_1|^2|r_2|^2 + |r_1|^2|t_2|^2 + 2Re\{t_1 r_1^* r_2^* t_2 e^{i(\theta_I - \theta_{II})}\} \tag{53}$$

$$p_\sigma = p_{\sigma\sigma I,\vec{\sigma}} = |t_1|^2|r_2|^2 + |r_1|^2|t_2|^2 \tag{54}$$

$$p_\psi = p_{\psi\psi I,\vec{\sigma}} = |t_1|^2|r_2|^2 + |r_1|^2|t_2|^2 - 2Re\{t_1 r_1^* r_2^* t_2 e^{i(\theta_I - \theta_{II})}\}. \tag{55}$$

In the "standard" encoding, a qubit is encoded in four anyons which have collective charge I such that the basis states $|0\rangle$ and $|1\rangle$ of the qubit are given by the states in which the σ anyons 1 and 2 (or a first qubit base pair of quasiparticles) fuse to I and ψ, respectively. (Since the collective charge of the four anyons is I, the fusion channel of anyons 3 and 4 (or a second qubit base pair of quasiparticles) is equal to that of 1 and 2.) The anyons 1 and 2 may be placed inside the central interferometric target region 316 of the quasiparticle interferometer 300 (making them the target quasiparticles 320 (A) with allowed collective charge values a=I and ψ) the anyons 3 and 4 may be placed outside the central interferometric target region 316 of the quasiparticle interferometer 300 in the external region 318 below the quasiparticle interferometer 300 (making them the complimentary-target quasiparticles 322 (C)). This is described by the corresponding initial target system density matrix $$\rho^{AC} = \sum_{a,a'=I,\psi} \rho^{AC}_{(a,a;I)(a',a';I)} |a, a; I\rangle\langle a', a'; I| \tag{56}$$

$$= \begin{bmatrix} \rho_{00} & \rho_{01} \\ \rho_{10} & \rho_{11} \end{bmatrix}$$

$$= \rho,$$

which has f=I, c=a, and c'=a'. The expression in terms of the qubit density matrix ρ uses the translation $|0\rangle = |I, I; I\rangle$ and $|1\rangle = |\psi, \psi; I\rangle$.

If the beam splitters 302 are such that $|t_1|^2 = |t_2|^2 = |r_1|^2 = |r_2|^2 = 1/2$, where the indices "1" and "2" refer to the beam splitters 302A, 302B, respectively, then the quasiparticle interferometer 300 may be tuned so that quasiparticle interferometer 300 will distinguish between the charges a=I and ψ using only a single σ probe quasiparticle 310. In particular, if parameters of the quasiparticle interferometer 300 are tuned so that $$t_1 r_1^* r_2^* t_2 e^{i(\theta_I - \theta_{II})} = \frac{1}{4},$$

then it is found that $$p_I = p_{III,\vec{\sigma}} = 1 \tag{57}$$

$$p_\psi = p_{\psi\psi I,\vec{\sigma}} = 0, \tag{58}$$

so if the single probe quasiparticle 310 is measured at the s=→ detector 306B, then the state is completely projected onto charge a=I, and if it is measured at the s=↑ detector 306A, then the state is completely projected onto charge a=ψ [assuming the state of the target anyons (target quasiparticles 320) was in a superposition of only these two charge values, as it is for the topological qubit describe in Eq. (56)].

Notice that if the same configuration of the quasiparticle interferometer 300 is used, but instead tune the parameters so that $$t_1 r_1^* r_2^* t_2 e^{i(\theta_I - \theta_{II})} = \frac{e^{i\phi}}{4},$$

then $$p_{III,\vec{\sigma}} = \frac{1}{2}[1 + \cos(\phi)] \tag{59}$$

$$= \cos^2(\phi/2)$$

$$p_{I\psi\psi,\vec{\sigma}} = \frac{i}{2}\sin(\phi) \tag{60}$$

$$= i\cos(\phi/2)\sin(\phi/2)$$

$$p_{\psi I\sigma,\vec{\sigma}} = -\frac{i}{2}\sin(\phi) \tag{61}$$

$$= -i\cos(\phi/2)\sin(\phi/2)$$

$$p_{\psi\psi I,\vec{\sigma}} = \frac{1}{2}[1 - \cos(\phi)] \tag{62}$$

$$= \sin^2(\phi/2).$$

If the target system is a topological qubit comprised of target quasiparticles 320 and complementary-target quasiparticles 322, as in Eq. (56), and a single a probe quasiparticle 310 is sent through the quasiparticle interferometer 300, the probe quasiparticle 310 will be measured at the s=→ and ↑ detectors with respective probabilities $$Pr(\rightarrow) = \cos^2\left(\frac{\phi}{2}\right)\rho_{00} + \sin^2\left(\frac{\phi}{2}\right)\rho_{11}, \tag{63}$$

$$Pr(\uparrow) = \sin^2\left(\frac{\phi}{2}\right)\rho_{00} + \cos^2\left(\frac{\phi}{2}\right)\rho_{11} \tag{64}$$

and the corresponding post-measurement target system density matrices will be $$\rho(\rightarrow) = \frac{1}{Pr(\rightarrow)} \begin{bmatrix} \cos^2\left(\frac{\phi}{2}\right)\rho_{00} & i\cos\left(\frac{\phi}{2}\right)\sin\left(\frac{\phi}{2}\right)\rho_{01} \\ -i\cos\left(\frac{\phi}{2}\right)\sin\left(\frac{\phi}{2}\right)\rho_{10} & \sin^2\left(\frac{\phi}{2}\right)\rho_{11} \end{bmatrix}, \tag{65}$$

$$\rho(\uparrow) = \frac{1}{Pr(\uparrow)} \begin{bmatrix} \sin^2\left(\frac{\phi}{2}\right)\rho_{00} & -i\cos\left(\frac{\phi}{2}\right)\sin\left(\frac{\phi}{2}\right)\rho_{01} \\ i\cos\left(\frac{\phi}{2}\right)\sin\left(\frac{\phi}{2}\right)\rho_{10} & \cos^2\left(\frac{\phi}{2}\right)\rho_{11} \end{bmatrix}. \tag{66}$$

This single probe interferometry measurement with tuned parameters can be used to generate states that cannot be obtained using braiding and complete interferometry operations. In particular, if initial state of the target system (i.e., the target quasiparticles 320 and the complementary-target particles 322) is prepared to be $$|\Psi_0\rangle = H|0\rangle \tag{67}$$

$$= \frac{1}{\sqrt{2}}[|0\rangle + |1\rangle],$$

then the final state after this single probe partial interferometry operations will be $$|\Psi_{\rightarrow}\rangle = |\mathcal{B}_{-\phi}\rangle \qquad (68)$$
$$= \cos(\phi/2)|0\rangle - i\sin(\phi/2)|1\rangle$$

$$|\Psi_{\rightarrow}\rangle = |\mathcal{B}_{\phi-\frac{\pi}{2}}\rangle \qquad (69)$$
$$= \sin(\phi/2)|0\rangle + i\cos(\phi/2)|1\rangle,$$

for the corresponding probe outcomes s=→ and ↑, respectively. If $\phi=\pi/4$, then these are magic states.

Of course, this single probe operation is not topologically protected as it requires fine-tuning of the interferometer's parameters. Moreover, it requires the ability to send precisely one probe quasiparticle 310 through the interferometer, which may be difficult depending on the system. Thus, this method is a topologically unprotected method of producing $\pi/8$-phase gates, which may require error-correction. Fortunately, it was shown that if one has access to topologically protected Clifford gates (as one does for Ising anyons), then magic states can be error-corrected using the "magic state distillation" protocol, which has a remarkably high error threshold of approximately 0.14. It is worth emphasizing that this method works for any Ising-type system, not just for pure Ising TQFTs.

It is worth considering how the single probe method worked and how generally it can be applied. A key property of this method was that the single probe measurement took an initial pure state to a final pure state. For this to be possible, the factors $p_{aa'e,b}{}^s$ of the pertinent charge values need to be writable as a product. This is actually the case for Ising-type anyons when a,a'=I and ψ, regardless of the values of the interferometer's parameters. In particular, for arbitrary parameter values, one can write $$p_{aa'e,b}{}^s = \mathcal{A}_a{}^s \mathcal{A}_{a'}{}^{s*}, \qquad (70)$$

(for a,a'=I and ψ and b=σ) where $$\mathcal{A}_I{}^{\rightarrow} = t_1 r_2^* e^{i\Theta_1} + r_1 t_2 e^{i\Theta_{II}} \qquad (71)$$

$$\mathcal{A}_\psi{}^{\rightarrow} = -t_1 r_2^* e^{i\Theta_1} + r_1 t_2 e^{i\Theta_{II}} \qquad (72)$$

$$\mathcal{A}_I{}^{\uparrow} = -t_1 t_2 * e^{i\Theta_I} + r_1 r_2 e^{i\Theta_{II}} \qquad (73)$$

$$\mathcal{A}_\psi{}^{\uparrow} = t_1 t_2 * e^{i\Theta_I} + r_1 r_2 e^{i\Theta_{II}}. \qquad (74)$$

Thus, applying a single a probe measurement with outcome s to a topological qubit in an arbitrary initial pure state $|\Psi\rangle = \Psi_0 |0\rangle + \Psi_1 |1\rangle$ results in the post-measurement state $$|\Psi\rangle \mapsto |\Psi(s)\rangle = \frac{\mathcal{A}_I{}^s \Psi_0 |0\rangle + \mathcal{A}_\psi{}^s \Psi_1 |1\rangle}{\left[|\mathcal{A}_I{}^s \Psi_0|^2 + |\mathcal{A}_\psi{}^s \Psi_1|^2\right]^{1/2}}. \qquad (75)$$

Similarly, if a user sends (a finite number) N probes through the quasiparticle interferometer 300 and n of them are measured with outcome s=→, the post-measurement state will be $$|\Psi\rangle \mapsto |\Psi_N(n)\rangle = \frac{(\mathcal{A}_I{}^{\rightarrow})^n (\mathcal{A}_I{}^{\uparrow})^{N-n} \Psi_0 |0\rangle + (\mathcal{A}_\psi{}^{\rightarrow})^n (\mathcal{A}_\psi{}^{\uparrow})^{N-n} \Psi_1 |1\rangle}{\left[|(\mathcal{A}_I{}^{\rightarrow})^n (\mathcal{A}_I{}^{\uparrow})^{N-n} \Psi_0|^2 + |(\mathcal{A}_\psi{}^{\rightarrow})^n (\mathcal{A}_\psi{}^{\uparrow})^{N-n} \Psi_1|^2\right]^{1/2}}. \qquad (76)$$

For the purposes of this disclosure, this is called a "partial interferometry" operation on a single qubit, since the post-measurement target system's state is not necessarily in a fixed state of definite charge a=I or ψ (i.e. having the qubit projected onto either $|0\rangle$ or $|1\rangle$), as would be the case resulting in the N→∞.

Similar to the single probe measurement, one could use partial interferometry for Ising anyons to generate qubit states that cannot be obtained using only Clifford gate operations. This is, however, not a deterministic process, as each probe sent through will have some probability of being found measured at either detector [with the probabilities of the outcomes given in Eq. (28)], so it will require adaptive post-measurement processing. Again, this is a topologically unprotected method of generating computational gates for Ising-type anyons, because it requires fine-tuning of the interferometer's parameters.

Quasiparticle Partial Interferometric Quantum Devices

Figure 4:
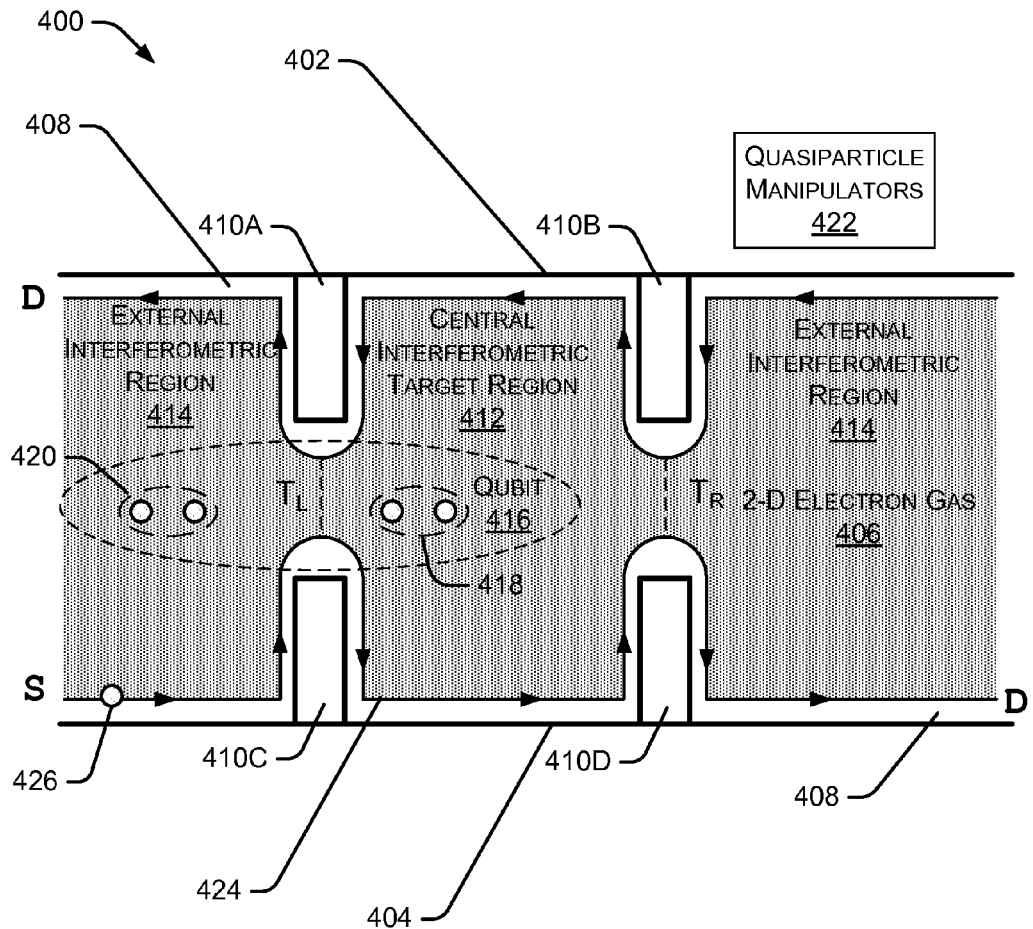
FIG. 4 is a schematic diagram of an example partial interferometric quantum device.

FIG. 4 is a schematic diagram of an example partial interferometric quantum device 400 for implementing the topological qubit quantum gate 206 of FIG. 2. The partial interferometric quantum device 400 may be a Fabry-Pérot double point contact interferometer, which may be utilized for quantum hall states, 2-dimensional $p_x \pm i p_y$ superconductors, and/or Majorana heterostructures.

The partial interferometric quantum device 400 includes a first side 402 and a second side 404. Region 406, shown shaded, is in a topological phase, and region 408 is in non-topological phase. For a quantum Hall system, region 406 may provide a 2-dimensional electron gas.

The partial interferometric quantum device 400 also includes a number of electrical gates, individually referenced as 410A-410D and collectively referenced as 410, that provide an electrical potential, which may be an electrostatic potential. In some instances, the electrical gates 410 may be controllable to provide a selectable amount of electrical potential. In some instances, the electrical gates 410 may provide a fixed amount of electrical potential, which may have been predetermined A region proximal to each of the electrical gates 410 may be driven between topological phase 406 and non-topological phase 408 based at least in part on the electrical potential provided by the electrical gates 410.

In the illustrated embodiment, the partial interferometric quantum device 400 includes four electrical gates 410 forming two contact pairs. The electrical gates 410A and 410B are separated from each other along the first side 402 and extend generally inward therefrom, and the other two electrical gates 410C and 410D extend generally inward from the second side 404 and are generally aligned with the electrical gates 410A and 410B. The electrical gates 410A and 410C comprise a first contact, and the electrical gates 410B and 410D comprise a second contact.

A central interferometric target region 412 is located between the electrical gates 410, and external interferometric regions 414 extend outward from the electrical gates 410. A qubit 416 is disposed in the partial interferometric quantum device 400 and is comprised of target quasiparticles 418 and complementary-target quasiparticles 420. The qubit 416 may be a 4-quasiparticle qubit. The target quasiparticles 418 of the qubit 416 are located in the central interferometric target region 412, and complementary-target quasiparticles 420 of the qubit 416 are located in the external interferometric region 414 to the left hand side of the central interferometric target region 412. In some instances, the complementary-target quasiparticles 420 of the qubit 416 may be located in the external interferometric region 414 to the right hand side of the central interferometric target region 412. In some instances, the target quasiparticles 418 may be qubit base quasiparticles, i.e., quasiparticles that were initially entangled together while initializing the qubit 416, and similarly, the complementary-target quasiparticles 420 may be qubit base quasiparticles.

The partial interferometric quantum device 400 may also include quasiparticle manipulators 422. The quasiparticle manipulators 422 may include devices and components such as, but not limited to, electrical gates including electrostatic gates, quantum effect microscopes, etc. for positioning the target quasiparticles 418 and the complementary-target quasiparticles 420. For example, individual electrostatic gates in an array may be controllably turned on and off to attract/repel a quasiparticle from one location to another. As another example, quantum effect microscopes such as, but not limited to, scanning tunneling microscopes, may be utilized to provide an electrical potential to attract/repel a quasiparticle from one location to another.

An edge line 424 marks the boundary between the topological region 406 and the non-topological region 408. Arrow heads on line 424 denote chirality of edge modes, which provides a probe quasiparticle 426 from a source. In some instances, the source (or sources) of the probe quasiparticle 426 may be to the upper right hand side of edge line 424. The probe quasiparticle 426 may tunnel between the first contact (comprised of electrical gates 410A and 410C) or between the second contact (comprised of electrical gates 410B and 410D). The first and second contacts have tunneling amplitudes of $T_L$ and $T_R$, respectively. The quasiparticle probe 426 may then be drawn away from the central interferometric target region 412 to drains (D).

Figure 5:
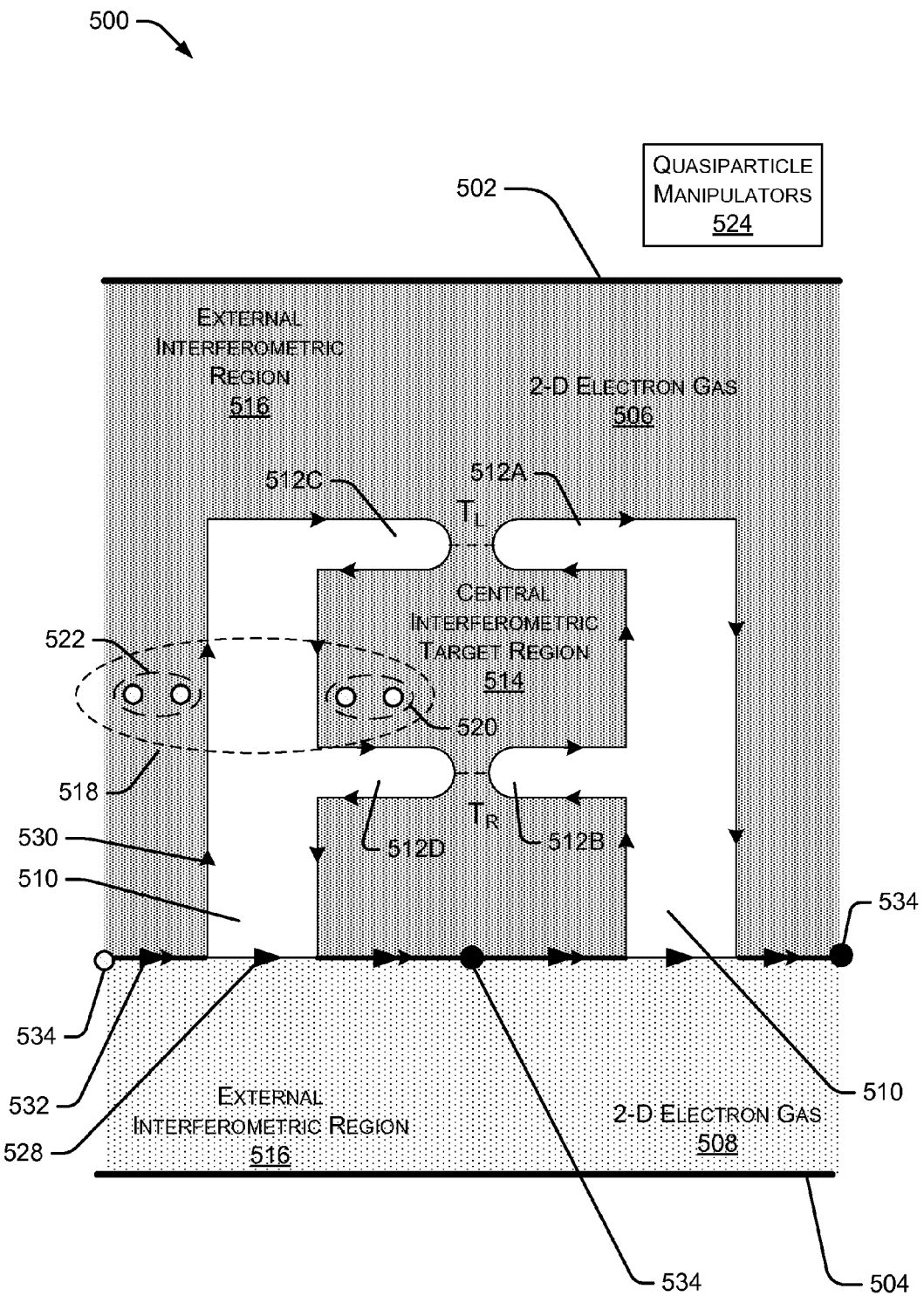
FIG. 5 is a schematic diagram of another example partial interferometric quantum device.

FIG. 5 is a schematic diagram of another example partial interferometric quantum device 500 for implementing the topological qubit quantum gate 206 of FIG. 2. The partial interferometric quantum device 500 may be a Fabry-Pérot double point contact interferometer, which may be utilized for quantum hall states, 2-dimensional $p_x \pm ip_y$ superconductors, and/or Majorana heterostructures and which utilizes a Dirac edge mode.

The partial interferometric quantum device 500 includes a first side 502 and a second side 504. Region 506, shown shaded, is in a $p_x \pm ip_y$ topological phase, and region 508 is in $p_x - ip_y$ topological phase. For a quantum Hall system, regions 506 and 508 may provide a 2-dimensional electron gas.

The partial interferometric quantum device 500 also includes topologically trivial phase regions 510. Each of the topologically trivial phase regions 510 have a number of arms, individually referenced as 512A-512D and collectively referenced as 512. In some instances, topologically trivial phase regions 510 (including the arms 512) may be controllable to switch between topological phase and topologically trivial phase so that the size and shape of the topologically trivial phase regions 510 may be dynamically adjusted. The partial interferometric quantum device 500 may include one or more electrical gates to induce phase changes between topological phase and topologically trivial phase.

In the illustrated embodiment, the partial interferometric quantum device 500 includes four arms 512 forming two contact pairs. The arms 512A and 512B are transversely separated from each other and extend generally longitudinally inward therefrom toward arms 512C and 512D, respectively. The arms 512A and 512C comprise a first contact, and the arms 512B and 512D comprise a second contact.

A central interferometeric target region 514 is located between the arms 512, and external interferometric regions 516 extend around the topologically trivial phase regions 510. A qubit 518 is disposed in the partial interferometric quantum device 500 and is comprised of target quasiparticles 520 and complementary-target quasiparticles 522. The qubit 518 may be a 4-quasiparticle qubit. The target quasiparticles 520 of the qubit 518 are located in the central interferometric target region 514, and complementary-target quasiparticles 522 of the qubit 518 are located in the external interferometric region 516 of the $p_x \pm ip_y$ topological phase region 506. In some instances, the complementary-target quasiparticles 522 of the qubit 518 may be located in the external interferometric region 516 of the $p_x - ip_y$ topological phase region 508. In some instances, the target quasiparticles 520 may be qubit base quasiparticles, i.e., quasiparticles that were initially entangled together while initializing the qubit 518, and similarly, the complementary-target quasiparticles 522 may be qubit base quasiparticles.

The partial interferometric quantum device 500 may also include quasiparticle manipulators 524. The quasiparticle manipulators 524 may include devices and components such as, but not limited to, electrical gates including electrostatic gates, quantum effect microscopes, etc. for positioning the target quasiparticles 520 and the complementary-target quasiparticles 522. For example, individual electrostatic gates in an array may be controllably turned on and off to attract/repel a quasiparticle from one location to another. As another example, quantum effect microscopes such as, but not limited to, scanning tunneling microscopes, may be utilized to provide an electrical potential to attract/repel a quasiparticle from one location to another.

An edge line 526 marks the boundary between the $p_x + ip_y$ topological phase region 506 and the $p_x - ip_y$ topological phase region 508. Large arrowheads 528 on line 526 denote chirality of edge modes of the $p_x - ip_y$ topological phase region 508, and small arrowheads 530 on line 526 denote chirality of edge modes of the $p_x + ip_y$ topological phase region 506. Double arrowheads 532 denote Dirac edge modes formed from the combination of the two Majorana $p_x + ip_y$ and $p_x - ip_y$ edge modes.

A probe quasiparticle 534 is provided from a source. The probe quasiparticle 524 may tunnel between the first contact (comprised of arms 512A and 512C) or between the second contact (comprised of arms 512B and 512D). The first and second contacts have tunneling amplitudes of $T_L$ and $T_R$, respectively. The quasiparticle probe 534 may then be drawn away from the central interferometric target region 514 to drains (D) 534.

Figure 6:
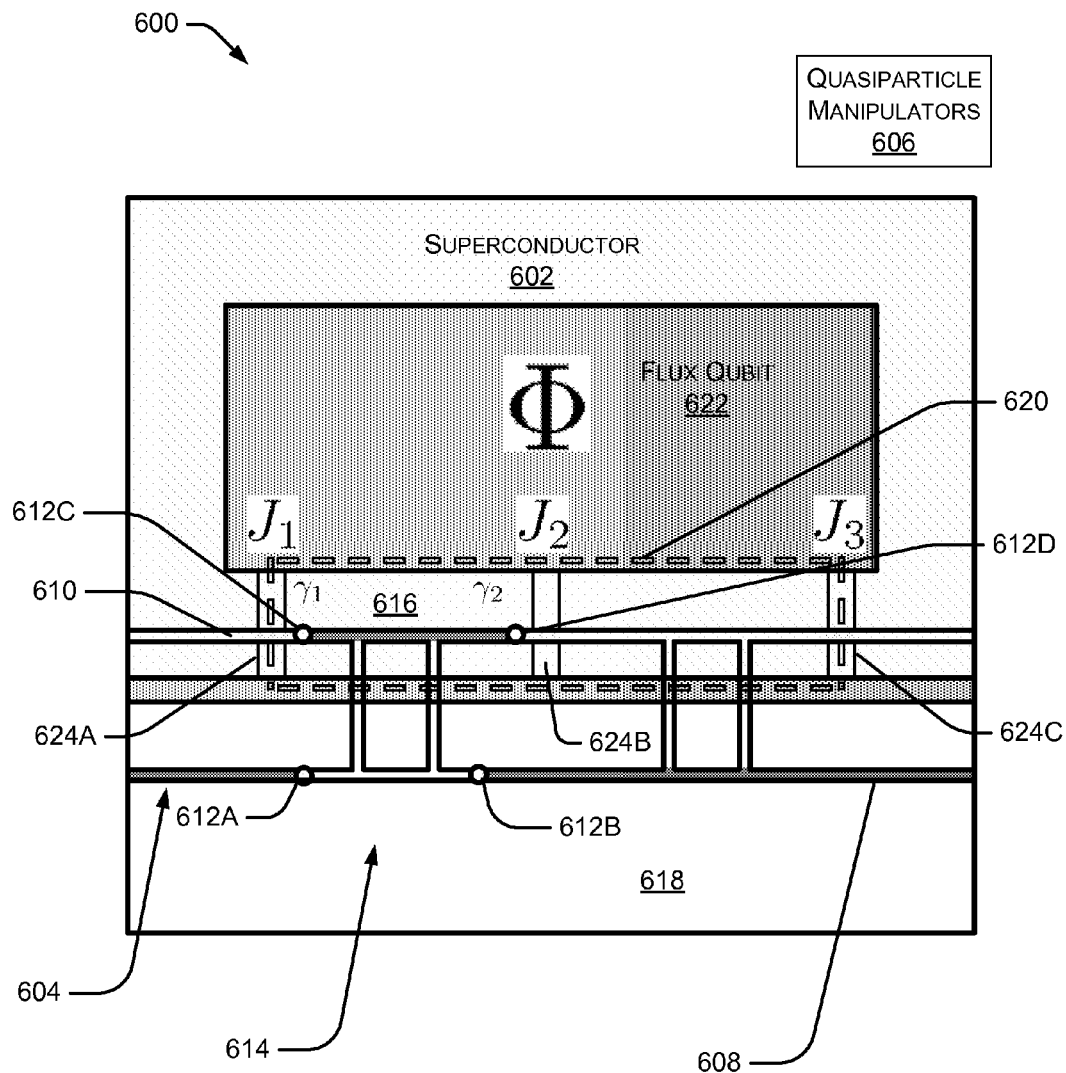
FIG. 6 is a schematic diagram of another example partial interferometric quantum device.

FIG. 6 is a schematic drawing of another example partial interferometric quantum device 600 for implementing the topological qubit quantum gate 206 of FIG. 2. The partial interferometric quantum device 600 may utilize Majorana heterostructures.

The partial interferometric quantum device 600 may include a superconductor 602, a Majorana wire network 604, and quasiparticle manipulators 604. The superconductor 602 may be comprised of an s-wave superconductor material such as, but not limited to, aluminum (Al) or nobium (Nb).

Majorana wire network 604 may be comprised of 1-dimensional nanowires or quasi-1-dimensional nanowires. A 1-dimensional nanowire may support a single mode and may have a longitudinal length in the orders of microns (μm), a thickness and a height in the range of a few nanometers (nm), e.g., 1-10 nm. A quasi-1-dimensional nanowire may support multiple modes, e.g., 1-10 modes, and may have a longitudinal length in the orders of microns (μm), a thickness in the range of 50-200 nm and a height in the range of a few nanometers, e.g., 1-10 nm. The Majorana wire network 604 may be comprised of a semiconductor such as indium antimonide (InSb) or Indium arsenide (InAs) and may be epitaxially grown.

The quasiparticle manipulators 606 may include a number of devices and components such as, but not limited to, electrical gates including electrostatic gates for providing electrical potentials to the superconductor 602 and/or the Majorana wire network 604 and flux generators for providing magnetic fields to the superconductor 602 and/or the Majorana wire network 604. The quasiparticle manipulators 606 may be utilized to controllably drive the selected regions, or region, of the superconductor 602 between superconductive phase and non-superconductive phase. Similarly, the quasiparticle manipulators 606 may be utilized to controllably drive the selected regions, or region, of the Majorana wire network 604 between topological phase and non-topological phase.

In the Majorana wire network 604, topological segments 608, which are illustrated in grey, are regions that are in topological phase, and non-topological segments 610 are regions that are in the non-topological phase, i.e., they are in the topologically trivial phase. For the purposes of this disclosure a topological phase region is defined as being in a topological superconducting phase with localized, unpaired zero-energy or low-energy Majorana modes localized at opposite ends of the segment. The non-topological phase regions do not have localized Majorana modes but can be induced to change into a topological phase region. Similarly, a topological phase region may be induced to change into a non-topological phase region. For example, an electric potential may be applied to a portion of a non-topological segment 610 to change the chemical potential in the portion of the non-topological segment 610, and the change in the chemical potential may then cause the portion to enter the topological phase, thereby changing the portion of the non-topological segment 610 into a topological phase segment 608. Each topological phase segment 608 has an unpaired non-abelian anyon or quasiparticle, individually referenced as 612A-612D and collectively referenced as 612, localized at each end of the topological phase segment 608. The quasiparticles 612 may be positioned within the Majorana wire network 604 by changing a portion of the non-topological segment 610 into a corresponding portion of topological segment 608, and vice-versa.

The quasiparticles 612 may comprise a qubit 614. In some instances, the quasiparticles 612C and 612D may be target quasiparticles positioned in a central interferometric target region 616, and the quasiparticles 612A and 612B may be complementary-target quasiparticles positioned in an external interferometric region 618. The central interferometric target region 616 may be bounded by a vortex circulation 620.

The partial interferometric quantum device 600 may utilize the Aharonov-Casher effect to apply a π/8 gate to a qubit. The Aharonov-Casher effect involves interference of particles with magnetic moment (vortices) moving around a line charge. It may enable performance of non-local measurements of charge in a region by utilizing the interference of vortices traveling through two different paths around the region. For superconducting systems it is natural to try to use Abrikosov vortices in this context. However, Abrikosov vortices in s-wave superconductors may have rather large mass due to the large number of subgap states localized in their cores. As a result, these vortices may behave classically.

An alternative is to use Josephson vortices (fluxons), which arise due to phase-slip events in Josephson junctions. Their effective mass is determined by the charging and Josephson energies of the junction, and can be much smaller than that of Abrikosov vortices, allowing them to behave quantum-mechanically. Indeed, the Aharonov-Casher effect with Josephson vortices has been experimentally observed, and several proposals have been made to utilize it in the context of topological quantum information processing.

The quasiparticle manipulators 606 may include a flux qubit Φ 622 having three Josephson junctions, individually referenced as 624A-624C and collectively referenced as 624, supports clockwise or counter-clockwise supercurrent. When the energy across the Josephson junction 624A ($E_{J1}$) is equal to the energy across the Josephson junction 624C ($E_{J2}$), there is interference between quantum phase slips across the Josephson junctions 624A and 624C. These phase slips correspond to Josephson vortex tunneling encircling the central interferometric target region 616 (or superconducting islands) as shown by the dashed line representing the vertex circulation 620. Via the Aharonov-Casher effect, quantum interference of vortices around the central interferometric target region 616 produces an energy splitting for the flux qubit (at its degeneracy point) that strongly depends on the state of the qubit 614.

More specifically, consider the superconducting flux qubit Φ with Josephson junctions designed to have left-right symmetry such that Josephson coupling energies $E_{J1}=E_{J3}\equiv E_J$. The two current-carrying states, clockwise $|\circlearrowright\rangle$ and counter-clockwise $|\circlearrowleft\rangle$, form the basis states of the flux qubit Φ. When the applied external flux piercing the flux qubit Φ is equal to a half flux quantum, i.e., Φ=h/4e, there is a degeneracy between the two current-carrying states. This degeneracy is lifted by the macroscopic quantum tunneling between the state $|\circlearrowright\rangle$ and $|\circlearrowleft\rangle$ due to the presence of a finite charging energy of the central interferometric target region 616, which tends to delocalize the phase. Thus, the new eigenstates of the qubit are $|\pm\rangle = (|\circlearrowright\rangle \pm |\circlearrowleft\rangle)/\sqrt{2}$. For the device shown in FIG. 6, the energy splitting between states $|\pm\rangle$ depends on the quantum interference of the fluxon trajectories. Indeed, the total Josephson energy of the qubit is $$\frac{U_J}{E_J} = -\left[\cos\varphi_1 + \cos\varphi_2 + \frac{E_{J2}}{E_J}\cos\left(2\pi\frac{\Phi}{\Phi_0} - \varphi_1 - \varphi_2\right)\right], \quad (77)$$

where it is assumed that $E_{J1}>E_J$, in contrast with values typically used for flux qubits.

The potential $U_J$ reaches its minima at two inequivalent points $(\varphi_1, \varphi_2)=(\pm\varphi^*+2\pi m, \mp\varphi^*\mp2\pi n)$ for a given n and m which correspond to clockwise and counter-clockwise circulating currents, and $\varphi^*=\cos^{-1}(E_J/E_{J2})$. Starting, for example, from the configuration with $(\varphi^*,-\varphi^*)$, there are two paths to tunnel to a different flux state: $(\varphi^*,-\varphi^*)\to(\varphi^*-2\pi,\varphi^*)$, and $(\varphi^*,-\varphi^*)\to(-\varphi^*,\varphi^*+2\pi)$, which correspond to a phase slip through junction $J_1$ or $J_3$, respectively. As a result, there is an interference between the two paths that encircle the central interferometric target region 616. Note that the amplitude for the phase slips across the middle Josephson junction 624B is suppressed in this setup since $E_{J2}>E_J$. This interference is sensitive to the total charge enclosed by the paths, i.e., the charge residing on the central interferometric target region 616, and is determined by the Berry phase contribution.

Illustrative Non-Quantum Computing Device

Figure 7:
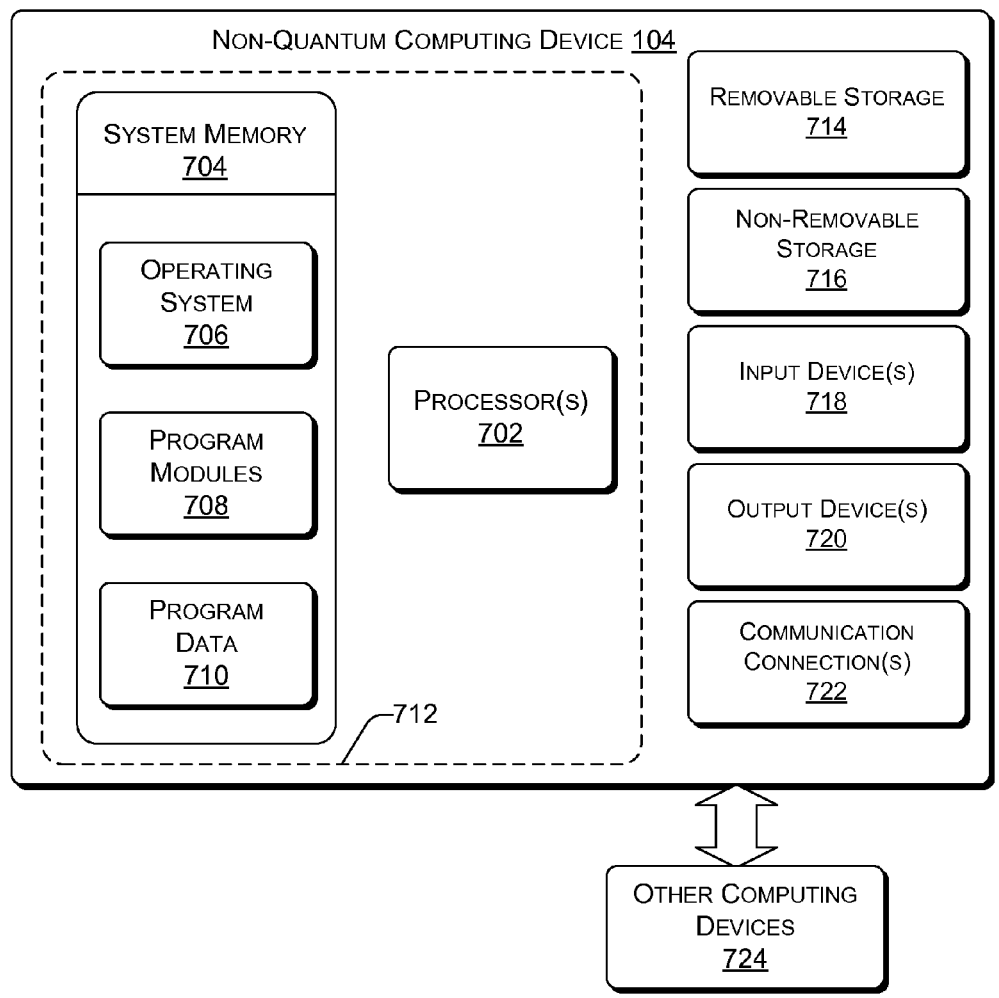
FIG. 7 is a schematic diagram of an illustrative non-quantum computing device 104 that may be used in environment of FIG. 1.

FIG. 7 shows an illustrative non-quantum computing device 104 that may be used in environment 100. It will readily be appreciated that the various embodiments described above may be implemented in other computing devices, systems, and environments. The non-quantum computing device 104 shown in FIG. 7 is only one example of a computing device and is not intended to suggest any limitation as to the scope of use or functionality of the computer and network architectures. The non-quantum computing device 104 is not intended to be interpreted as having any dependency or requirement relating to any one or combination of components illustrated in the example computing device.

In a very basic configuration, the non-quantum computing device 104 typically includes at least one processor 702 and system memory 704. The processor 702 is a non-quantum processing unit such as, for example, a conventional computer processor such as a digital processor. Depending on the exact configuration and type of computing device, the system memory 704 may be volatile (such as RAM), non-volatile (such as ROM, flash memory, etc.) or some combination of the two. The system memory 704 typically includes an operating system 706, one or more program modules 708, and may include program data 710. The computing device 104 is of a very basic configuration demarcated by a dashed line 712.

The program modules 708 may include instructions for, among other things, implementing simulations of quantum systems on the non-quantum computing device 104, providing control signals to the quantum computing system 102, and receiving data from the quantum computing system 102. In addition, the program modules 708 may include instructions for, implementing simulations of quantum calculations and/or simulating quantum computers.

The non-quantum computing device 104 may have additional features or functionality. For example, the computing device 104 may also include additional data storage devices (removable and/or non-removable) such as, for example, magnetic disks, optical disks, or tape. Such additional storage is illustrated in FIG. 7 by removable storage 714 and non-removable storage 716. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 704, the removable storage 714 and the non-removable storage 716 are all examples of computer storage media. Computer storage media includes, but is not limited to, random-access-memory (RAM), read-only-memory (ROM), electrically erasable programmable ROM (EEPROM), flash memory or other memory technology, compact disk (CD), CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the non-quantum computing device 104. Any such computer storage media may be part of the non-quantum computing device 104. Moreover, the computer-readable media may include computer-executable instructions that, when executed by the processor(s) 702, perform various functions and/or operations described herein.

In contrast, communication media embodies computer-readable instructions, data structures, program modules, or other data in a modulated data signal, such as a carrier wave, or other transmission mechanism. As defined herein, computer storage media does not include communication media.

The non-quantum computing device 104 may also have input device(s) 718 such as keyboard, mouse, pen, voice input device, touch input device, etc. Output device(s) 720 such as a display, speakers, printer, etc. may also be included. These devices are well known in the art and are not discussed at length here.

The non-quantum computing device 104 may also contain communication connections 722 that allow the device to communicate, such as over a network, with other computing devices 724 including the quantum computing system 102. These networks may include wired networks as well as wireless networks. The communication connections 722 are one example of communication media.

The illustrated non-quantum computing device 104 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, handheld or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

Example Partial Interferometric Quantum Gate Technique

Figure 8:
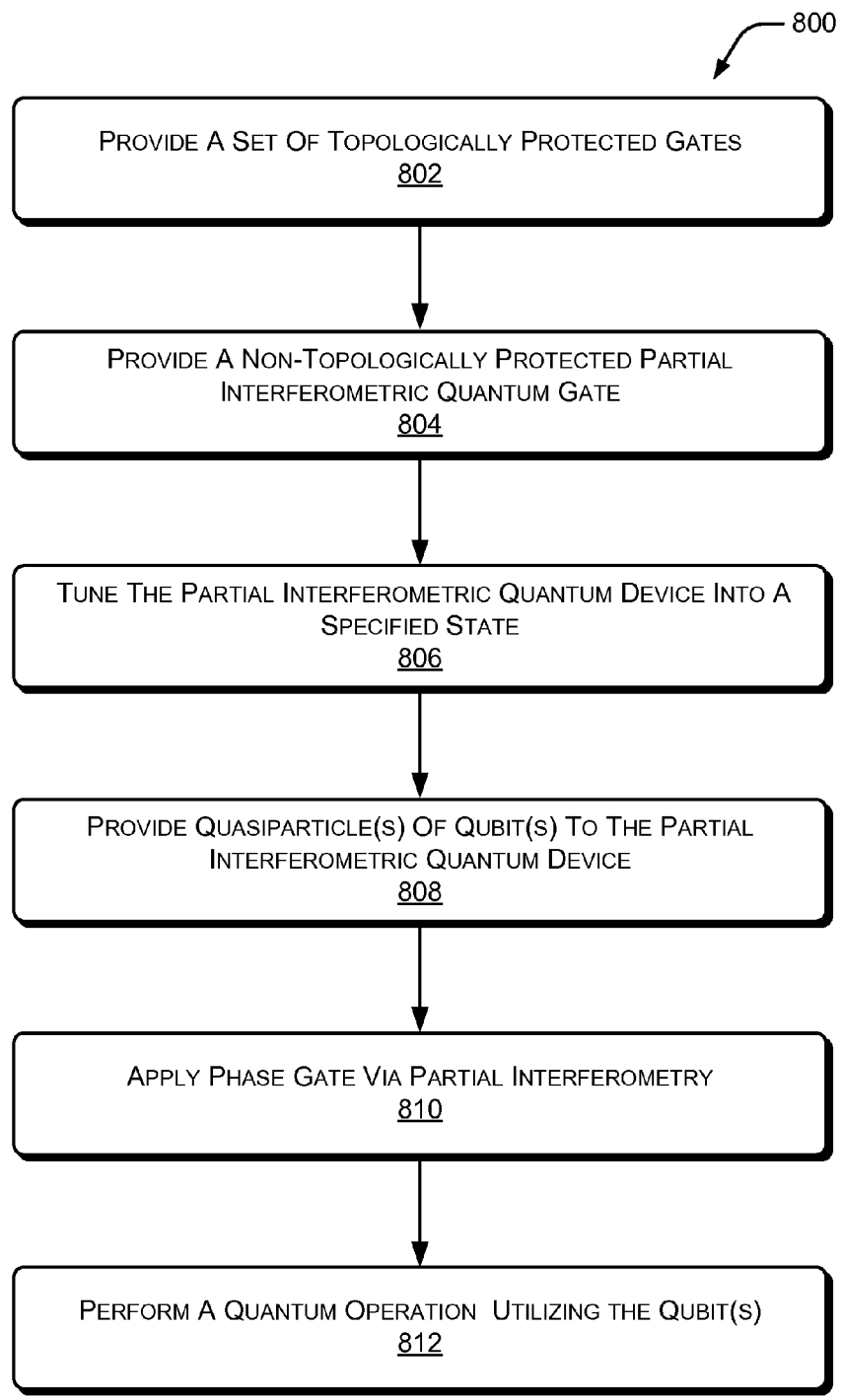
FIG. 8 is a flow diagram of an example process for performing a quantum operation utilizing a partial interferometric quantum device.

FIG. 8 is a flow diagram of an example process 800 for generating a desired state utilizing partial interferometry. The process 800 and other processes discussed herein are, or may be, illustrated as a collection of blocks in a logical flow graph, which represent a sequence of operations that can be implemented in hardware such as, but not limited to, non-quantum computing devices (e.g., digital computers), quantum devices (e.g., quantum computing systems) and/or a combination thereof, software/algorithms for non-quantum computing devices and/or quantum devices, or a combination hardware and software/algorithm(s). In the context of software/algorithms, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process(es).

At 802, a set of topologically protected quantum gates are provided. The set of topologically protected quantum gates may include the Clifford gates.

At 804, a non-topologically protected partial interferometric quantum device is provided. In some instances, the non-topologically protected partial interferometric quantum device may be a quantum device with which the set of topologically protected gates make a universally complete set of quantum gates. In some instances, the non-topologically protected partial interferometric quantum device may be utilized to apply a π/8 quantum gate to a topological qubit. In some instances, the non-topologically protected partial interferometric quantum device may include a Fabrey-Pérot interferometer.

At 806, the non-topologically protected partial interferometric quantum device may be tuned into a desired state. Operational parameters such as, but not limited to, applied electric fields, applied magnetic fields, size of the central interferometric target region of the non-topologically protected partial interferometric quantum gate, shape of the he central interferometric target region of the non-topologically protected partial interferometric quantum device, quasiparticle path differences of the non-topologically protected partial interferometric quantum device, tunneling coefficients of the non-topologically protected partial interferometric quantum device, and reflection coefficients of the non-topologically protected partial interferometric quantum device may be tuned such that the non-topologically protected partial interferometric quantum device may provide operations on qubits that can be utilized to produce states that can be turned into phase gates such as, but not limited to, the π/4 "magic state" and the π/8 gate.

At 808, one or more topological qubits are provided to the non-topologically protected partial interferometric quantum device. Some of the quasiparticles of the topological qubits may be positioned in a central interferometric region of the non-topologically protected partial interferometric quantum device, and the remaining quasiparticles of the topological qubit may be positioned in an external region of the non-topologically protected partial interferometric quantum device. The quasiparticles of the topological qubits may be positioned via quasiparticle manipulators such as, but not limited to, electrical gates, scanning tip microscopes, and Majorana wire networks. In some instances, some of the quasiparticles positioned in the central interferometric region of the non-topologically protected partial interferometric quantum device may comprise one or more qubit base m-tuples of quasiparticles. In some instances, all of the quasiparticles positioned in the central interferometric region of the non-topologically protected partial interferometric quantum device comprise one or more qubit base m-tuples of quasiparticles.

At 810, the non-topologically protected partial interferometric quantum device is utilized to apply a phase gate to the one or more topological qubits. In some instances, the phase gate may generate a desired state for the one or more topological qubits such as, but not limited to, magic states for the one or more topological qubits. In some instances, such as when the phase gate has been applied to multiple topological qubits, "magic state distillation" may be performed on the multiple topological qubits to yield a topological qubit with a polarization along a magic direction. This topological qubit may be consumed to generate a π/8 gate.

At 812, a quantum operation may be performed utilizing at least one of the topological qubits. In some instances, the operation may be to apply a π/8 gate to a topological qubit. In some instances, the quantum operation may be to perform a quantum calculation via braiding topological qubits.

CONCLUSION

The above-described techniques pertain to applying a π/8 gate via partial interferometry operations to a topological qubit. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method of performing quantum operations, the method comprising:
   applying a partial interferometric device to at least one qubit.

2. The method of claim 1, wherein the at least one qubit is a single qubit, and wherein applying the partial interferometric device to the single qubit includes:
   generating a single qubit gate.

3. The method of claim 2, wherein generating a single qubit gate further comprises:
   positioning target quasiparticles of the single qubit in a central interferometric target region of the partial interferometric device, wherein the target quasiparticles are non-Abelian quasiparticles.

4. The method of claim 2, wherein the single qubit gate is a θ/2 phase gate.

5. The method of claim 1, wherein the at least one qubit comprises multiple qubits, the method further comprising:
   generating entangling gates.

6. The method of claim 1, wherein qubit is comprised of a plurality of quasiparticles and the quasiparticles of the qubit are entangled only with other quasiparticles of the qubit.

7. The method of claim 1, wherein the at least one qubit is comprised of a plurality of quasiparticles, each quasiparticle of the plurality of quasiparticles being one of a Ising-type quasiparticle or a Majorana zero mode quasiparticle.

8. The method of claim 7, further comprising:
   applying a π/8 phase gate to a computational qubit.

9. The method of claim 8, further comprising:
   applying magic state distillation protocol to the at least one qubit.

10. A quantum circuit comprising:
    a partial interferometric device configured to apply a phase gate to a topological qubit.

11. The quantum circuit of claim 10, further comprising:
    a quasiparticle manipulator configured to manipulate quasiparticles of the topological qubit, wherein the quasiparticle manipulator is configured to position at least one of target quasiparticles of the topological qubit in a central interferometric target region of the partial interferometric device and complementary-target quasiparticles of the topological qubit in an external interferometric region.

12. The quantum circuit of claim 10, wherein the partial interferometric device includes a Fabry-Pérot double point contact interferometer.

13. The quantum circuit of claim 12, wherein edge modes of the Fabry-Pérot double point contact interferometer provide at least one probe quasiparticle.

14. The quantum circuit of claim 10, wherein the topological qubit is comprised of non-Abelian quasiparticles.

15. The quantum circuit of claim 10, further comprising:
    a quasiparticle source, wherein the quasiparticle source comprises one or more of a 5/2 Quantum Hall system, a topological superconductor, a Majorana heterostructure, and a Majorana wire.

16. A quantum computer comprising:
    at least one topologically protected quantum gate; and
    a partial interferometric device configured to apply a qubit operator to a topological qubit.

17. The quantum computer of claim 16, further comprising:
    an error correction device configured to apply error correction to the topological qubit.

18. The quantum computer of claim 16, further comprising:
    a quasiparticle manipulator configured to manipulate topological quasiparticles of the topological qubit, wherein the quasiparticle manipulator is configured to position at least one of target topological quasiparticles of the topological qubit in a central interferometric target region of the partial interferometric device and complementary-target topological quasiparticles of the topological qubit in an external interferometric region.

19. The quantum computer of claim 16, wherein the partial interferometric device includes a Fabry-Pérot double point contact interferometer.

20. The quantum computer of claim 16, further comprising:
   a topological qubit component configured to provide the topological qubit, the topological qubit component comprising at least one of a quantum Hall 5/2 system, a topological superconductor, a Majorana heterostructure, and a Majorana wire network; and wherein the qubit operator is a $\pi/8$ operator.

* * * * *